(12) United States Patent
Yamamoto et al.

(10) Patent No.: US 8,593,758 B2
(45) Date of Patent: Nov. 26, 2013

(54) DISK DRIVE SPINDLE MOTOR WITH ADHESIVE FIXING SEAL CAP TO SHAFT AND UPPER THRUST PLATE

(75) Inventors: Takashi Yamamoto, Kyoto (JP); Tsuchitsugu Watanabe, Kyoto (JP)

(73) Assignee: Nidec Corporation, Kyoto (JP)

( * ) Notice: Subject to any disclaimer, the term of this patent is extended or adjusted under 35 U.S.C. 154(b) by 85 days.

(21) Appl. No.: 13/353,563

(22) Filed: Jan. 19, 2012

(65) Prior Publication Data

US 2012/0243397 A1 Sep. 27, 2012

(30) Foreign Application Priority Data

Mar. 25, 2011 (JP) ................................. 2011-066988

(51) Int. Cl.
*G11B 19/20* (2006.01)
*H02K 5/167* (2006.01)
*F16C 33/74* (2006.01)

(52) U.S. Cl.
USPC .......... 360/99.08; 310/67 R; 310/80; 384/124

(58) Field of Classification Search
USPC ................ 360/98.07, 99.08; 310/67 R, 90; 384/107, 121, 124
See application file for complete search history.

(56) References Cited

U.S. PATENT DOCUMENTS

| | | | |
|---|---|---|---|
| 5,880,545 A | 3/1999 | Takemura et al. | |
| 6,991,376 B2 | 1/2006 | Aiello et al. | |
| 2004/0090702 A1 | 5/2004 | Aiello et al. | |
| 2006/0182374 A1 | 8/2006 | Schwamberger et al. | |
| 2007/0030591 A1 | 2/2007 | Engesser et al. | |
| 2007/0133911 A1 | 6/2007 | Nishimoto et al. | |
| 2008/0187257 A1 | 8/2008 | Engesser et al. | |
| 2008/0292228 A1 | 11/2008 | Yamashita et al. | |
| 2009/0140587 A1 | 6/2009 | Popov et al. | |
| 2010/0124387 A1 | 5/2010 | Fuss et al. | |
| 2010/0142869 A1 | 6/2010 | Grantz et al. | |
| 2010/0266225 A1 | 10/2010 | Yamashita et al. | |
| 2011/0192210 A1 | 8/2011 | Yamashita et al. | |

FOREIGN PATENT DOCUMENTS

| | | |
|---|---|---|
| JP | 06-028335 U | 4/1994 |
| JP | 08-275435 A | 10/1996 |
| JP | 2003-056555 A | 2/2003 |
| JP | 2003-061295 A | 2/2003 |
| JP | 2006-105390 A | 4/2006 |
| JP | 2007-162759 A | 6/2007 |

(Continued)

OTHER PUBLICATIONS

Mizukami et al., "Motor and Storage Disk Drive," Chinese Patent Application No. 201210021666.6, filed Jan. 31, 2012.

(Continued)

*Primary Examiner* — Craig A. Renner
(74) *Attorney, Agent, or Firm* — Keating & Bennett, LLP

(57) ABSTRACT

A spindle motor includes a stationary portion and a rotating portion including a seal defining portion. The stationary portion includes a shaft portion, an annular member fixed to an upper portion of the shaft portion in, for example, a tight-fitting condition, and a cap member. A radially inner end portion of the cap member is fixed to each of the shaft portion and the annular member preferably through, for example, an adhesive. An upper seal portion, in which a surface of a lubricating oil is arranged, is defined in an upper seal gap defined between an outer circumferential surface of the annular member and an inner circumferential surface of the seal defining portion. The cap member is arranged to cover an upper side of the upper seal portion.

17 Claims, 18 Drawing Sheets

(56) References Cited

FOREIGN PATENT DOCUMENTS

| | | |
|---|---|---|
| JP | 2009-136143 A | 6/2009 |
| JP | 2010-121775 A | 6/2010 |
| KR | 10-2010-0064349 A | 6/2010 |

OTHER PUBLICATIONS

Mizukami et al., "Spindle Motor and Storage Disk Drive," U.S. Appl. No. 13/198,776, filed Aug. 5, 2011.
Mizukami et al., "Spindle Motor and Storage Disk Drive," U.S. Appl. No. 13/198,784, filed Aug. 5, 2011.
Mizukami et al., "Spindle Motor and Storage Disk Drive," U.S. Appl. No. 13/198,787, filed Aug. 5, 2011.
Mizukami et al., "Spindle Motor and Storage Disk Drive," U.S. Appl. No. 13/198,793, filed Aug. 5, 2011.
Mizukami et al., "Spindle Motor and Storage Disk Drive," U.S. Appl. No. 13/198,794, filed Aug. 5, 2011.
Mizukami et al., "Spindle Motor and Storage Disk Drive," U.S. Appl. No. 13/198,797, filed Aug. 5, 2011.
Yamaguchi et al., "Method of Manufacturing Fluid Dynamic Bearing Mechanism, Motor, and Storage Disk Drive," U.S. Appl. No. 13/353,554, filed Jan. 19, 2012.
Tamaoka et al., "Motor and Storage Disk Drive," U.S. Appl. No. 13/353,557, filed Jan. 19, 2012.
Kimura et al., "Bearing Apparatus, Spindle Motor, and Disk Drive Appartus," U.S. Appl. No. 12/791,147, filed Jun. 1, 2010.
Watanabe et al., "Spindle Motor and Disk Drive Apparatus," U.S. Appl. No. 13/898,921, filed May 21, 2013.
Mizukami et al., "Spindle Motor and Storage Disk Drive," U.S. Appl. No. 13/739,402, filed Jan. 11, 2013.
Mizukami et al., "Spindle Motor and Storage Disk Drive," U.S. Appl. No. 13/739,415, filed Jan. 11, 2013.

DISK DRIVE SPINDLE MOTOR WITH ADHESIVE FIXING SEAL CAP TO SHAFT AND UPPER THRUST PLATE

BACKGROUND OF THE INVENTION

1. Field of the Invention

The present invention relates to a spindle motor and a storage disk drive.

2. Description of the Related Art

Some known motors for use in storage disk drives include a bearing mechanism using a fluid dynamic pressure. An example of such a motor is disclosed in JP-A 2003-56555 and includes a bracket, a shaft, a rotor, and two thrust plates. A lower end of the shaft is fixed in a central opening of the bracket. The rotor includes a sleeve portion in which the shaft is inserted. The sleeve portion is supported to be rotatable with respect to the shaft through a lubricating fluid. Each of the two thrust plates is fixed to an outer circumferential surface of the shaft through press fit and adhesion in the vicinity of a separate end opening of a through hole of the sleeve portion. A thrust bearing portion is defined between an upper portion of the sleeve portion and one of the thrust plates which is arranged above the sleeve portion. The lubricating fluid is arranged in the thrust bearing portion.

An inner circumferential surface of the thrust plate includes a press-fitting surface and an annular recessed portion defined therein. The annular recessed portion is arranged on a lower side of the press-fitting surface. An adhesive is held between the annular recessed portion and the shaft.

Meanwhile, another example of a known spindle motor is disclosed in JP-A 2003-61295 which includes a shaft, ball bearings, a cap, and a rotor hub. An inner race of each ball bearing is fitted to the shaft. The rotor hub is fitted to an outer race of each ball bearing. The cap is arranged above the ball bearings to cover the ball bearings. The cap includes an inner projection and an outer projection, each of which is annular and is arranged to project downward, defined in an inner edge and an outer edge thereof, respectively. The inner projection is fitted to the shaft or the inner race of the upper ball bearing. The outer projection is arranged in a recessed portion defined between the outer race of the upper ball bearing and the rotor hub. A minute gap is defined between the outer projection and the recessed portion. A space defined between the cap and an upper portion of the upper ball bearing is arranged to be in communication with an outside of the motor through the minute gap. The minute gap is arranged to produce a labyrinth seal effect to prevent grease filled into the ball bearings from leaking out of the motor.

Meanwhile, an example of another known motor disclosed in JP-A 08-275435 includes ball bearings, a sleeve fixed to outer circumferential surfaces of the ball bearings, and a cap arranged to cover an upper side of the ball bearings. The cap includes a disk portion and an outer wall portion. The outer wall portion is arranged to extend downward from an outer circumference of the disk portion. A labyrinth seal structure is defined between the outer wall portion and a top portion of the sleeve which is arranged radially inward of the outer wall portion.

SUMMARY OF THE INVENTION

In some spindle motors (hereinafter referred to simply as "motors"), a gap is defined between an annular member fixed to a shaft portion and a sleeve portion of a rotating portion, the sleeve portion being arranged on a lower side of the annular member. In some of such motors, a seal portion in which a surface of a lubricating oil is arranged is defined around the annular member. The seal portion is, for example, covered with a cap member fixed to the annular member When the annular member is press fitted to the shaft portion during assemblage of the motor, an outer circumferential surface of the shaft portion or an inner circumferential surface of the annular member may be scratched. If this happens, a portion of the lubricating oil which is present in the gap defined between the annular member and the sleeve portion may leak upwardly out of the annular member through the scratched circumferential surface.

Preferred embodiments of the present invention provide a spindle motor of a storage disk drive including a stationary portion including a stator, and a rotating portion. The rotating portion preferably includes a rotor magnet, and is arranged to rotate with respect to the stationary portion through a lubricating oil. The stationary portion preferably includes a shaft portion, an annular member, and an annular cap member. The shaft portion is centered on a central axis extending in a vertical direction. The annular member is fixed to an upper portion of the shaft portion preferably in a tight-fit condition. The cap member includes a radially inner end portion fixed to each of the shaft portion and the annular member preferably through, for example, an adhesive. The rotating portion preferably includes a sleeve portion and a seal defining portion. The seal defining portion is arranged radially outward of the annular member to extend in an axial direction so as to be cylindrical or substantially cylindrical.

An outer circumferential surface of the annular member and an inner circumferential surface of the seal defining portion are arranged to together define an upper seal gap therebetween. The upper seal gap includes an upper seal portion defined therein. The upper seal portion preferably includes a surface of the lubricating oil arranged therein.

The cap member is arranged to cover an upper side of the upper seal portion. A lower end of a fixing region over which the shaft portion and the annular member are in contact with each other is arranged to be in contact with the lubricating oil, while an upper end of the fixing region is preferably covered with the adhesive over an entire circumference thereof.

According to the above-described preferred embodiment of the present invention, it is easy to prevent any leakage of the lubricating oil through a gap defined between the shaft portion and the annular member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that an upper side and a lower side in a direction parallel or substantially parallel to a central axis of a motor are referred to as an "upper side" and a "lower side", respectively. Note that the terms "vertical direction", "upper side", "lower side", and the like as used herein are not meant to indicate relative positions or directions of different members or portions when they are actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
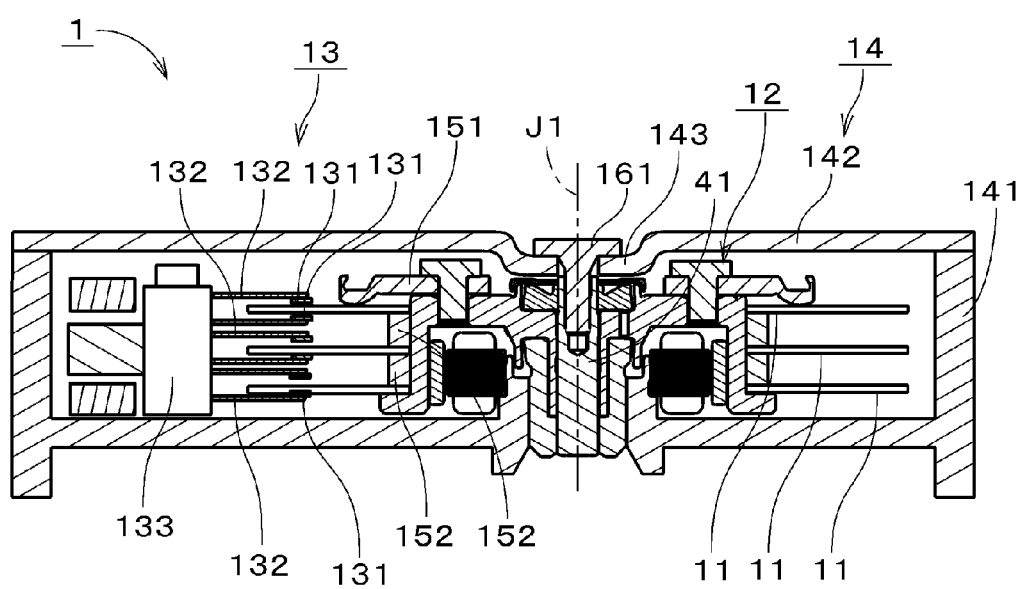
FIG. 1 is a cross-sectional view of a storage disk drive according to a first preferred embodiment of the present invention.

FIG. 1 is a vertical cross-sectional view of a storage disk drive 1 including a spindle motor (hereinafter referred to simply as a "motor") 12 according to a first preferred embodiment of the present invention. The storage disk drive 1 is preferably a so-called hard disk drive. The storage disk drive 1 preferably includes three disks 11, the motor 12, an access portion 13, and a housing 14, for example. The motor 12 is arranged to rotate the disks 11, in which information is stored. The access portion 13 is arranged to perform at least one of reading and writing of information from or to the disks 11. Note that the access portion 13 may be arranged to perform both the reading and writing of information from or to the disks 11.

The housing 14 preferably includes a first housing member 141 and a second housing member 142. The first housing member 141 is preferably arranged in the shape of a cup. The second housing member 142 is preferably arranged in the shape of a flat plate. The disks 11, the motor 12, and the access portion 13 are arranged inside the first housing member 141. The second housing member 142 is fitted to the first housing member 141 to define the housing 14. An interior space of the storage disk drive 1 is preferably a clean space with no or only an extremely small amount of dirt or dust. In the present preferred embodiment, air is arranged in the interior space of the storage disk drive 1. Note that the interior space of the storage disk drive 1 may be filled with a helium gas, a hydrogen gas, or a mixture of either or both of these gases and air.

The three disks 11 are clamped to a rotor hub of the motor 12 through a clamper 151 and spacers 152 such that the disks 11 are arranged at regular intervals in a direction parallel or substantially parallel to a central axis J1 of the motor 12. The access portion 13 preferably includes six heads 131, six arms 132, and a head actuator mechanism 133. Each of the heads 131 is arranged in close proximity to one of the disks 11 to magnetically perform at least one of the reading and the writing of information from or to the disk 11. Each of the arms 132 is arranged to support an associated one of the heads 131. The head actuator mechanism 133 is arranged to actuate each of the arms 132 to move an associated one of the heads 131 relative to an associated one of the disks 11. The above mechanism enables the head 131 to make access to a desired location on the rotating disk 11 with the head 131 being arranged in close proximity to the disk 11. Note that the number of disks 11 is not limited to three, but may be one, two, or any other number more than three.

Figure 2:
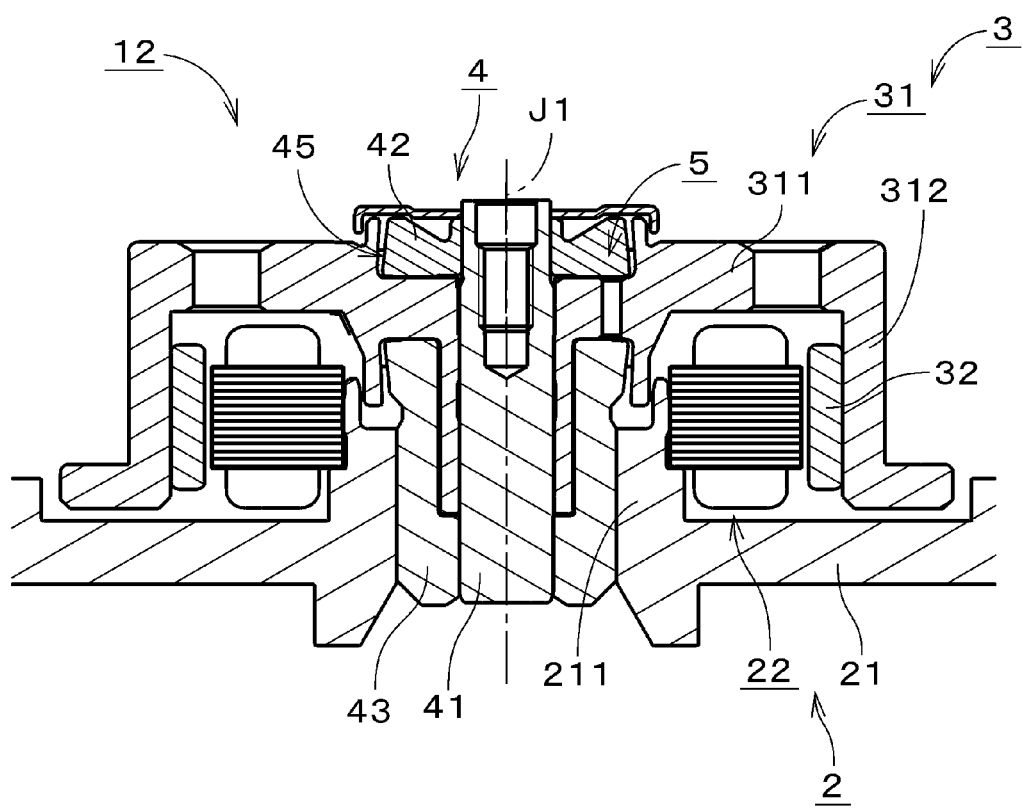
FIG. 2 is a cross-sectional view of a motor according to the first preferred embodiment of the present invention.

FIG. 2 is a vertical cross-sectional view of the motor 12. The motor 12 is preferably an outer-rotor motor. The motor 12 includes a stationary portion 2 and a rotating portion 3. In FIG. 2, a fluid dynamic bearing mechanism (hereinafter referred to as a "bearing mechanism"), which is defined by a portion of the stationary portion 2 and a portion of the rotating portion 3, is indicated by reference numeral "4". The rotating portion 3 is supported through a lubricating oil 45 such that the rotating portion 3 is rotatable about the central axis J1 of the motor 12 with respect to the stationary portion 2.

The stationary portion 2 preferably includes a base plate 21, a stator 22, a shaft portion 41, an upper thrust portion 42, i.e., an annular member, and a lower thrust portion 43. The base plate 21 and the first housing member 141 illustrated in FIG. 1 are preferably defined by a single continuous monolithic member, and are arranged to define a portion of the housing 14. The stator 22 is fixed to a circumference of a cylindrical holder 211 defined in the base plate 21. A hole portion is preferably defined inside the holder 211. Note that the base plate 21 and the first housing member 141 may alternatively be defined by separate members if so desired.

The shaft portion 41 preferably includes a screw hole defined in an upper portion thereof. A central portion 143 of the second housing member 142 illustrated in FIG. 1 is recessed downward. A screw 161 is inserted into a through hole defined in the central portion 143 and the screw hole of the shaft portion 41 to thereby fix the second housing member 142 and the shaft portion 41 to each other.

The rotating portion 3 preferably includes a rotor hub 31 and a rotor magnet 32. The rotor hub 31 preferably includes a substantially cylindrical sleeve portion 5, a cover portion 311, and a cylindrical portion 312. The sleeve portion 5, the cover portion 311, and the cylindrical portion 312 are preferably defined by a single continuous monolithic member. The cover portion 311 is arranged to extend radially outward from an upper portion of the sleeve portion 5. The cylindrical portion 312 is arranged to extend downward from an outer edge portion of the cover portion 311. The rotor magnet 32 is fixed to an inside of the cylindrical portion 312. The rotor magnet 32 is arranged radially opposite the stator 22. A torque is generated between the stator 22 and the rotor magnet 32. Note that the sleeve portion 5 may alternatively be defined by a member independent from the cover portion 311 and the cylindrical portion 312 if so desired. In that case, the sleeve portion 5 is fixed to the cover portion 311.

The rotating portion 3 is arranged to rotate with respect to the shaft portion 41, the upper thrust portion 42, and the lower thrust portion 43 through the lubricating oil 45 while the motor 12 is driven.

Figure 3:
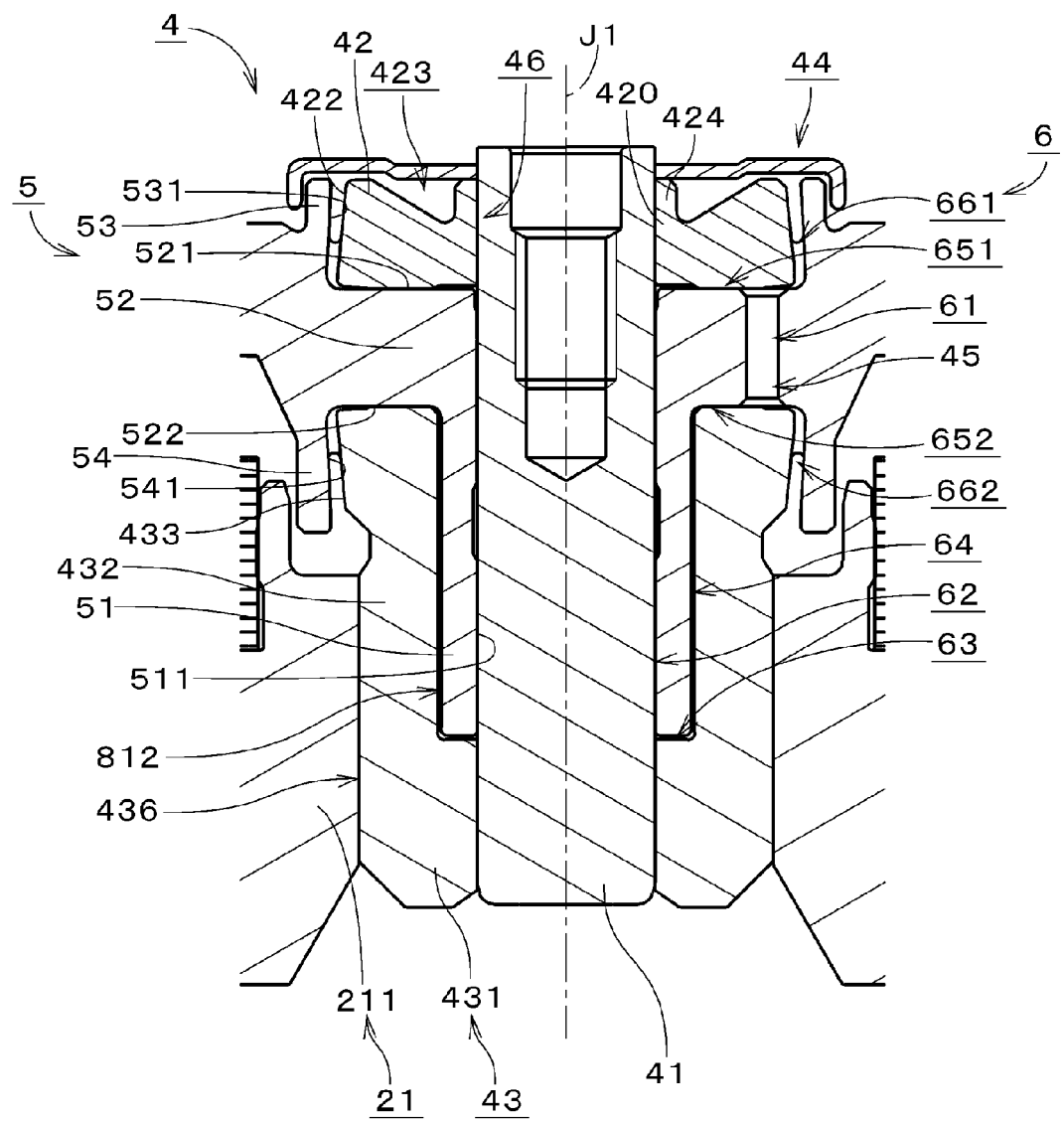
FIG. 3 is a cross-sectional view of a bearing mechanism according to the first preferred embodiment of the present invention.

FIG. 3 is an enlarged view of the bearing mechanism 4. The bearing mechanism 4 preferably includes the shaft portion 41, the upper thrust portion 42, the lower thrust portion 43, the sleeve portion 5, a seal cap 44, and the lubricating oil 45. As mentioned above, each of the shaft portion 41, the upper thrust portion 42, and the lower thrust portion 43 defines a portion of the stationary portion 2, while the sleeve portion 5 defines a portion of the rotating portion 3. The shaft portion 41 is inserted in the sleeve portion 5. A lower portion of the shaft portion 41 is preferably, for example, press fitted into and fixed in a hole portion defined inwardly of the lower thrust portion 43, and is arranged to extend in a vertical direction along the central axis J1. The upper thrust portion 42 is arranged to extend radially outward from an upper portion of the shaft portion 41. The upper thrust portion 42 is fixed to the upper portion of the shaft portion 41 preferably in a tight-fit condition. That is, the upper thrust portion 42 is preferably press fitted and thereby fixed to the upper portion of the shaft portion 41 preferably in the tight-fit condition. Hereinafter, a region over which an inner circumferential surface of the upper thrust portion 42 and an outer circumferential surface of the shaft portion 41 are arranged to be in contact with each other will be referred to as a "fixing region 46". In addition, a portion of the upper thrust portion 42 which is fixed to the shaft portion 41 will be referred to as a "joining portion 420".

An upper portion of the upper thrust portion 42 preferably includes a recessed portion 423, which is annular in shape. An upper portion 424 of the joining portion 420, which is arranged radially inward of the recessed portion 423, is cylindrical in shape and is arranged to extend upward along the outer circumferential surface of the shaft portion 41. Hereinafter, the upper portion 424 will be referred to as a "cylindrical portion 424". Each of the shaft portion 41 and the upper thrust portion 42 is preferably made of stainless steel or the like, for example. An outer circumferential surface 422 of the upper thrust portion 42 includes an inclined surface which is angled radially inward with increasing height. Note that the tight-fit condition may preferably be achieved by shrink fitting or other suitable process, for example.

The lower thrust portion 43 preferably includes a lower plate portion 431 and an outer tubular portion 432. The lower thrust portion 43 is preferably made of copper, high-strength brass, or the like, for example. The lower plate portion 431 is arranged to extend radially outward from the lower portion of the shaft portion 41. The outer tubular portion 432 is arranged to extend upward from an outer edge portion of the lower plate portion 431. An upper portion of an outer circumferential surface of the outer tubular portion 432 includes an inclined surface 433 which is angled radially inward with decreasing height.

In assembling the motor 12, a lower portion of the outer circumferential surface of the outer tubular portion 432 is preferably fixed to an inner circumferential surface of the holder 211 of the base plate 21 through, for example, an adhesive. In comparison to press fitting, the above method enables vertical positioning of the outer tubular portion 432 relative to the base plate 21 to be achieved with greater precision, whereby improved precision in the height of the motor 12 is achieved.

The sleeve portion 5 preferably includes an inner tubular portion 51, a flange portion 52, an upper hub tubular portion 53, and a lower hub tubular portion 54. The inner tubular portion 51 is arranged in a cylindrical or substantially cylindrical space that is defined between the outer tubular portion 432 and the shaft portion 41. The flange portion 52 is arranged to project radially outward from an upper portion of the inner tubular portion 51. Note that, in the following description, a portion that can be considered as either an inner circumferential portion of the flange portion 52 or the upper portion of the inner tubular portion 51 is regarded as a portion of the inner tubular portion 51. The axial thickness of the flange portion 52 is preferably arranged to be about half or less than about half of the axial dimension of an inner circumferential surface 511 of the inner tubular portion 51. Both an upper surface 521 and a lower surface 522 of the flange portion 52 are preferably arranged to be perpendicular or substantially perpendicular to the central axis J1. The flange portion 52 includes a communicating hole 61 arranged to extend through the flange portion 52 from the upper surface 521 to the lower surface 522 thereof.

The upper hub tubular portion 53 is arranged substantially in the shape of a cylinder, and is arranged to extend upward from an outer edge portion of the flange portion 52. The upper hub tubular portion 53 is arranged radially outward of the upper thrust portion 42. An inner circumferential surface 531 of the upper hub tubular portion includes a portion that is angled radially inward with increasing height.

The lower hub tubular portion 54 is preferably arranged in the shape of a cylinder or substantially in the shape of a cylinder, and is arranged to extend downward from the outer edge portion of the flange portion 52. The lower hub tubular portion 54 is arranged radially outward of the outer tubular portion 432 of the lower thrust portion 43. An inner circumferential surface 541 of the lower hub tubular portion 54 includes a portion that is angled radially inward with decreasing height. Note that each of the upper hub tubular portion 53 and the lower hub tubular portion 54 may be defined by a member independent of the flange portion 52 if so desired.

Figure 4:
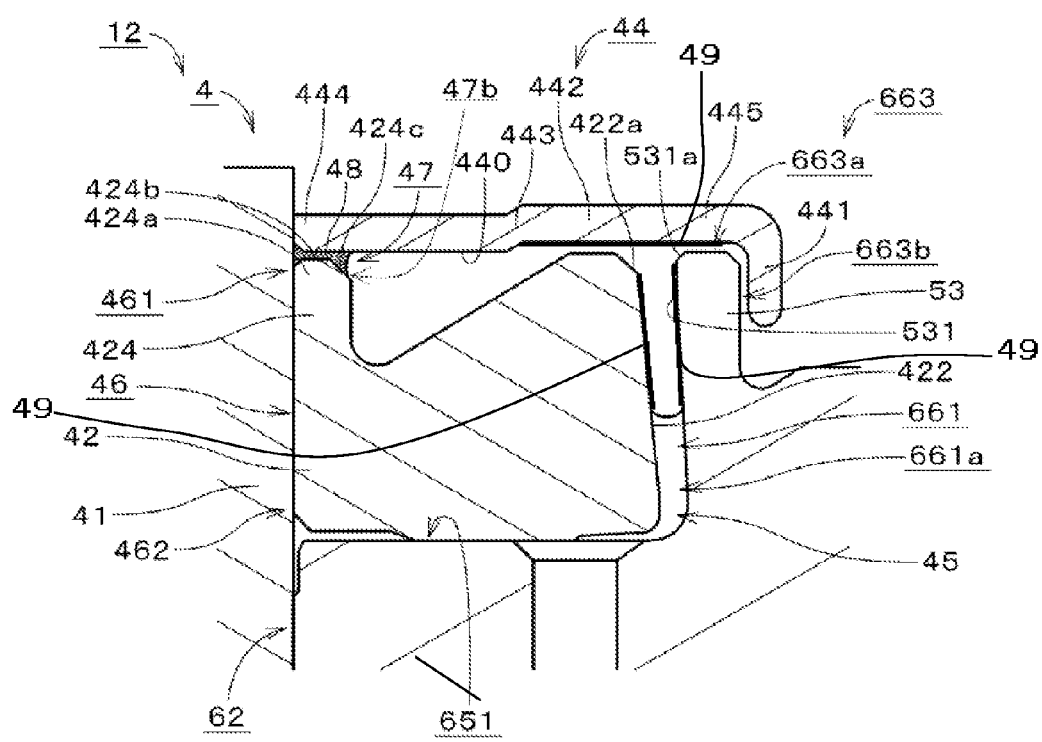
FIG. 4 is another cross-sectional view of the bearing mechanism.

FIG. 4 is an enlarged view of an upper portion of the bearing mechanism 4. The seal cap 44 preferably includes a cap cover portion 442 and a cap cylindrical portion 441. The cap cylindrical portion 441 is arranged to extend downward from a radially outer end portion of the cap cover portion 442. A lower surface 440 of the cap cover portion 442 includes a shoulder portion 443 which is annular and which is arranged to extend downward with decreasing distance from the central axis J1. Hereinafter, the shoulder portion 443 will be referred to as an "annular shoulder portion 443". An inner end portion 444 of the cap cover portion 442, i.e., a radially inner end portion thereof, is fixed to the outer circumferential surface of the shaft portion 41 preferably through, for example, press fitting and adhesion, and is fixed to an upper end portion 424a of the cylindrical portion 424 of the upper thrust portion 42 through adhesion. The inner end portion 444 of the cap cover portion 442 corresponds to a radially inner end portion of the cap member. An outer edge portion of the upper end portion 424a of the cylindrical portion 424 includes an inclined surface 424c which is angled downward with increasing distance from the central axis J1. An upper surface 424b of the upper end portion 424a of the cylindrical portion 424 of the upper thrust portion 42, the outer circumferential surface of the shaft portion 41, and the lower surface 440 of the seal cap are arranged to together define a holding gap 47 therebetween. An adhesive 48 is held in the holding gap 47.

An outer edge portion 445 of the cap cover portion 442, i.e., a radially outer edge portion thereof, is arranged axially opposite an upper end of the upper hub tubular portion 53. A radially extending gap 663a is defined between the outer edge portion 445 and the upper hub tubular portion 53. The axial width of the radially extending gap 663a is preferably in the range of about 0.05 mm to about 0.2 mm, for example.

The cap cylindrical portion 441 is arranged radially opposite an outer circumferential surface of the upper hub tubular portion 53, which is arranged to extend in an axial direction. An axially extending gap 663b is defined between the cap cylindrical portion 441 and the outer circumferential surface of the upper hub tubular portion 53. The radial width of the axially extending gap 663b is preferably in the range of about 0.05 mm to about 0.2 mm, for example.

Figure 5:
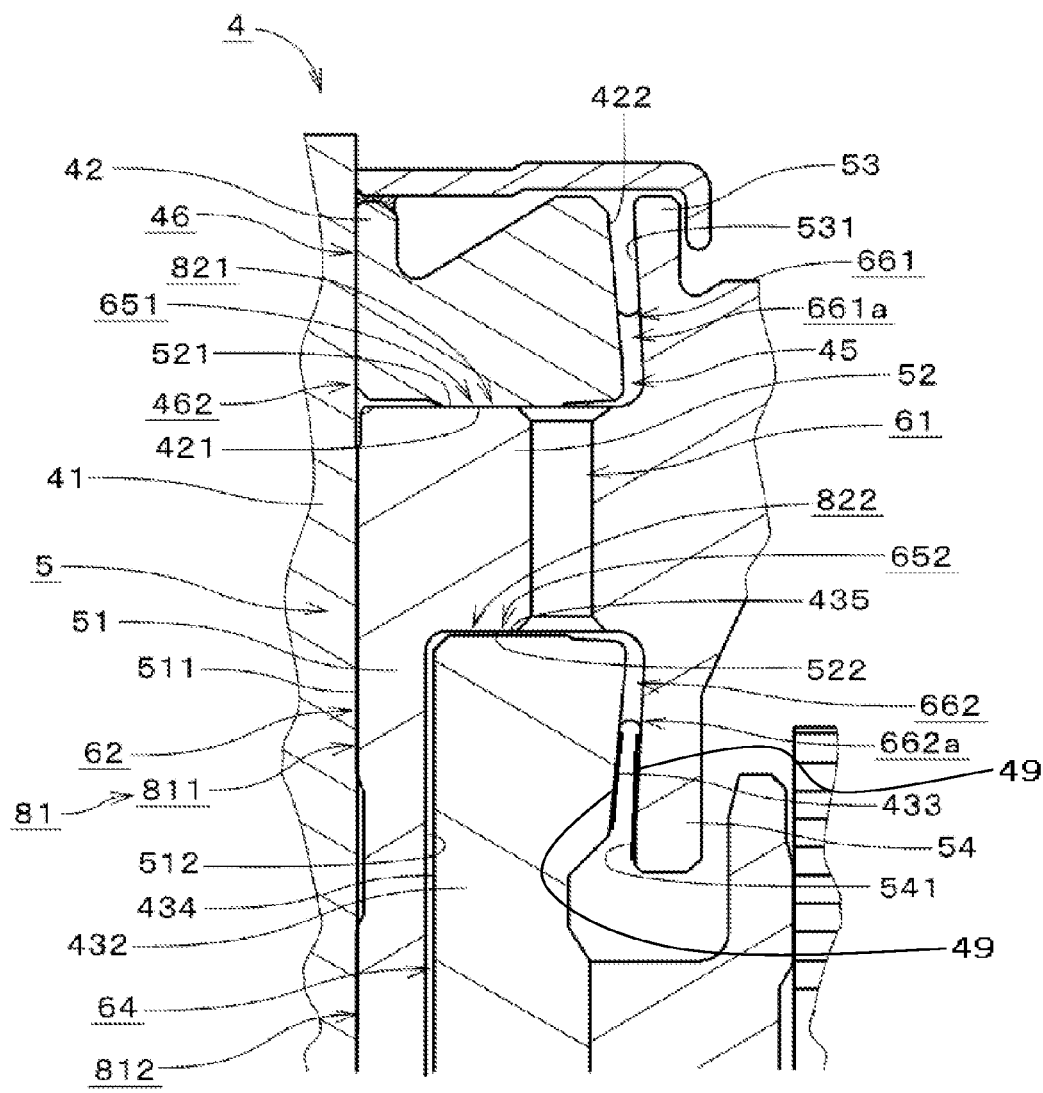
FIG. 5 is yet another cross-sectional view of the bearing mechanism.

FIG. 5 is a diagram illustrating the bearing mechanism 4. The outer circumferential surface of the shaft portion 41 is arranged radially opposite the inner circumferential surface 511 of the inner tubular portion 51 of the sleeve portion 5. A radial gap 62 is defined between the shaft portion 41 and the inner tubular portion 51. The radial width of the radial gap 62 is preferably in the range of about 2 μm to about 4 μm, for example. Referring to FIG. 3, an axial gap 63 is defined between a lower end of the inner tubular portion 51 and the lower plate portion 431. Hereinafter, the gap 63 will be referred to as a "lower end gap 63". Note that, in the present preferred embodiment, the radial gap 62 corresponds to a first gap.

Referring to FIG. 5, a gap 64 in the shape of a cylinder is defined between an outer circumferential surface 512 of the inner tubular portion 51 and an inner circumferential surface 434 of the outer tubular portion 432. Hereinafter, the gap 64 will be referred to as a "cylindrical gap 64". Referring to FIG. 3, the cylindrical gap 64 is arranged to be in communication with the radial gap 62 through the lower end gap 63. The radial width of the cylindrical gap 64 is preferably greater than the radial width of the radial gap 62 and smaller than the diameter of the communicating hole 61. Note that, in the present preferred embodiment, the cylindrical gap 64 corresponds to a second gap.

Referring to FIG. 5, a gap 651 is defined between a portion of the upper surface 521 of the flange portion 52 which is radially inward of the communicating hole 61 and a lower surface 421 of the upper thrust portion 42. Hereinafter, the gap 651 will be referred to as an "upper thrust gap 651". A lower end 462 of the fixing region 46, over which the shaft portion 41 and the upper thrust portion 42 are fixed to each other, is arranged to be in contact with the lubricating oil 45 at a junction of the upper thrust gap 651 and the radial gap 62. A gap 652 is defined between a portion of the lower surface 522 of the flange portion 52 which is radially inward of the communicating hole 61 and an upper surface 435 of the outer tubular portion 432. Hereinafter, the gap 652 will be referred to as a "lower thrust gap 652". The upper thrust gap 651 and the lower thrust gap 652 are arranged to be in communication with each other through the communicating hole 61. In the bearing mechanism 4, the radial gap 62, the lower end gap 63, the cylindrical gap 64, the upper thrust gap 651 and the lower thrust gap 652, and the communicating hole 61 are arranged in this order from a radial inside to a radial outside. Note that, in the present preferred embodiment, the lower thrust gap 652 corresponds to a third gap.

The inner circumferential surface 531 of the upper hub tubular portion 53 is arranged radially opposite the outer circumferential surface 422 of the upper thrust portion 42. A gap 661 is defined between the upper hub tubular portion 53 and the upper thrust portion 42. The gap 661 is preferably arranged radially outward of all of the radial gap 62, the upper thrust gap 651, and the communicating hole 61. The gap 661 is arranged to gradually increase in width with increasing height, that is, with decreasing distance from an upper end opening of the gap 661. Hereinafter, the gap 661 will be referred to as an "upper seal gap 661". Moreover, the upper seal gap 661 is arranged to be angled toward the central axis J1, that is, to the left in FIG. 5, with increasing height. An upper seal portion 661a is defined in the upper seal gap 661. A surface of the lubricating oil 45 is located in the upper seal portion 661a. In the upper seal portion 661a, the lubricating oil 45 is retained through capillary action.

The axial width of the radially extending gap 663a illustrated in FIG. 4 is preferably smaller than a maximum radial width of the upper seal gap 661. The maximum radial width of the upper seal gap 661 refers to the radial distance in a plan view between an upper end edge of a chamfer surface 422a, which is defined above the outer circumferential surface 422 of the upper thrust portion 42, and an upper end edge of a chamfer surface 531a, which is defined above the inner circumferential surface 531 of the upper hub tubular portion 53. Note that the chamfer surfaces 422a and 531a do not necessarily need to be defined in the upper thrust portion 42 and the upper hub tubular portion 53, respectively, in an upper portion of the upper seal gap 661 and could be omitted if so desired. In this case, the maximum radial width of the upper seal gap 661 refers to the radial distance between an upper end edge of the outer circumferential surface 422 and an upper end edge of the inner circumferential surface 531 of the upper hub tubular portion 53. Similarly, the radial width of the axially extending gap 663b is arranged to be smaller than the maximum radial width of the upper seal gap 661. Hereinafter, the radially extending gap 663a and the axially extending gap 663b will be referred to collectively as a "communicating gap 663".

The upper seal portion 661a is arranged to be in communication with an outside of the motor 12 through the communicating gap 663. The communicating gap 663 preferably has a very small width which contributes to reducing the likelihood that air including lubricating oil gasified in the upper seal portion 661a will travel to the outside of the motor 12 through the communicating gap 663. Moreover, the communicating gap 663 having a labyrinth structure, defined by the radially extending gap 663a and the axially extending gap 663b, contributes to further reducing the likelihood that air including gasified lubricating oil will travel through the communicating gap 663. This contributes to reducing evaporation of the lubricating oil 45, and to lengthening a life of the bearing mechanism 4.

Oil-repellent films 49 are preferably arranged on the inner circumferential surface 531 and the outer circumferential surface 422 on an upper side of the surface of the lubricating oil 45 in the upper seal gap 661. The oil-repellent films 49 may also be arranged on an upper end surface of the upper hub tubular portion 53 and the upper surface of the upper thrust portion 42.

The seal cap 44 is arranged to cover an upper side of the upper seal portion 661a. An oil-repellent film 49 is arranged at all circumferential positions on a portion of the lower surface 440 of the cap cover portion 442 of the seal cap 44 which is radially outward of the annular shoulder portion 443. The oil-repellent film 49 may be arranged on the annular shoulder portion 443 as well. The arrangement of the oil-repellent films 49 on the seal cap 44, the upper thrust portion 42, and the upper hub tubular portion 53 in the bearing mechanism 4 contributes to preventing the lubricating oil 45 from leaking out of the upper seal portion 661a.

Referring to FIG. 5, the inner circumferential surface 541 of the lower hub tubular portion 54, which is arranged to extend in the axial direction, is arranged radially opposite the inclined surface 433 of the outer tubular portion 432. A gap 662 is defined between the lower hub tubular portion 54 and the outer tubular portion 432. The gap 662 is arranged radially outward of all of the radial gap 62, the lower end gap 63 illustrated in FIG. 3, the cylindrical gap 64, the lower thrust gap 652, and the communicating hole 61. The gap 662 is arranged to gradually increase in width with decreasing height, that is, with decreasing distance from a lower end opening of the gap 662. Hereinafter, the gap 662 will be referred to as a "lower seal gap 662". Moreover, the lower seal gap 662 is arranged to be angled to the left in FIG. 5 with decreasing height. The lower seal gap 662 is arranged to be in communication with the upper seal gap 661 through the communicating hole 61. A lower seal portion 662a is defined in the lower seal gap 662. A surface of the lubricating oil 45 is located in the lower seal portion 662a. As described above, the upper hub tubular portion 53 of the sleeve portion 5 serves as a seal defining portion which contributes to defining the upper seal portion 661a. Moreover, the lower hub tubular portion 54 of the sleeve portion 5 serves as another seal defining portion which contributes to defining the lower seal portion 661b. Oil-repellent films 49 are arranged on the inner circumferential surface 541 and the inclined surface 433 on a lower side of the surface of the lubricating oil 45 in the lower seal gap 662.

The axial distance between the surface of the lubricating oil 45 in the upper seal portion 661a and the surface of the lubricating oil 45 in the lower seal portion 662a is shorter than the axial length of the radial gap 62. Moreover, the length of the communicating hole 61 is shorter than the axial distance between the surface of the lubricating oil 45 in the upper seal portion 661a and the surface of the lubricating oil 45 in the lower seal portion 662a. It is assumed here that the distance between the surface of the lubricating oil 45 in the upper seal portion 661a and the surface of the lubricating oil 45 in the lower seal portion 662a refers to the distance between an upper end of the surface of the lubricating oil 45 in the upper seal portion 661a and a lower end of the surface of the lubricating oil 45 in the lower seal portion 662a.

Referring to FIG. 3, the outside diameter of the upper seal gap 661 is preferably equal or substantially equal to the outside diameter of the lower seal gap 662. This makes it possible to arrange the communicating hole 61 to extend in parallel or substantially in parallel with the central axis J1. It is assumed here that the outside diameter of the upper seal gap 661 refers to the outside diameter of an end of the upper seal gap 661 on a side closer to the upper thrust gap 651, and that the outside diameter of the lower seal gap 662 refers to the outside diameter of an end of the lower seal gap 662 on a side closer to the lower thrust gap 652.

Figure 6:
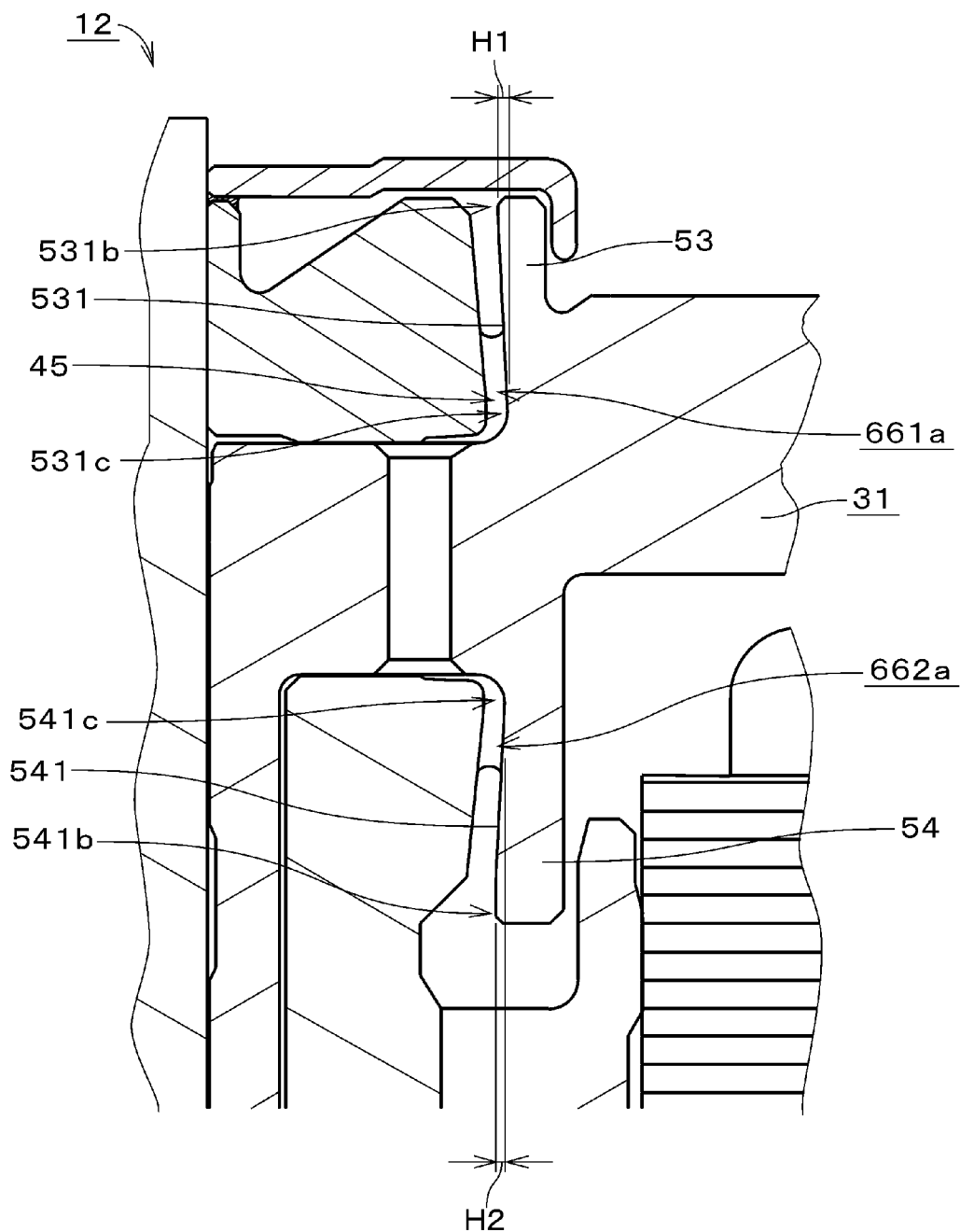
FIG. 6 is yet another cross-sectional view of the bearing mechanism.

Referring to FIG. 6, the diameter of an upper end 531b of the inner circumferential surface 531 of the upper hub tubular portion 53 is equal or substantially equal to the diameter of a lower end 541b of the inner circumferential surface 541 of the lower hub tubular portion 54. In addition, the diameter of a lower end 531c of the inner circumferential surface 531 of the upper hub tubular portion 53 is substantially equal to the diameter of an upper end 541c of the inner circumferential surface 541 of the lower hub tubular portion 54. That is, the radial extension range H1 of the inner circumferential surface 531 of the upper hub tubular portion 53 and the radial extension range H2 of the inner circumferential surface 541 of the lower hub tubular portion 54 substantially coincide with each other when viewed in the axial direction. Therefore, during rotation of the motor 12, centrifugal forces of the same or substantially the same magnitude act on the lubricating oil 45 in the upper seal portion 661a and the lower seal portion 662a. Moreover, air currents that are generated in the upper seal portion 661a and the lower seal portion 662a, respectively, due to the rotation of the rotor hub 31 are prevented from significantly differing from each other. This contributes to stabilizing balance between the surfaces of the lubricating oil 45 in the upper seal portion 661a and the lower seal portion 662a.

Note that, in the motor 12, the upper end 531b of the inner circumferential surface 531 of the upper hub tubular portion 53 may be displaced in the radial direction from the lower end 541b of the inner circumferential surface 541 of the lower hub tubular portion 54. Preferably, a difference between the diameter of the upper end 531b of the inner circumferential surface 531 of the upper hub tubular portion 53 and the diameter of the lower end 541b of the inner circumferential surface 541 of the lower hub tubular portion 54 is smaller than the maximum radial width of the upper seal portion 661a.

In the bearing mechanism 4 illustrated in FIG. 3, the communicating hole 61 and a space 6 extending from the upper seal gap 661 to the lower seal gap 662 through the upper thrust gap 651, the radial gap 62, the lower end gap 63, the cylindrical gap 64, and the lower thrust gap 652 are continuously filled with the lubricating oil 45. When the bearing mechanism 4 is assembled, the lubricating oil 45 is fed into the bearing mechanism 4 through the lower seal gap 662 with the lower seal gap 662 arranged to face upward in the direction of gravity. It is possible to control the amount of the lubricating oil 45 by visually identifying the height of the surface of the lubricating oil 45 in the lower seal gap 662.

Note that the visual identification may be conducted either with eyes alone or with a magnified view of the lower seal gap 662 with the aid of a device such as, for example, a microscope. Also note that the visual identification may also be conducted with a magnified image of the lower seal gap 662 shown on a display screen with the aid of a magnification device.

Figure 7:
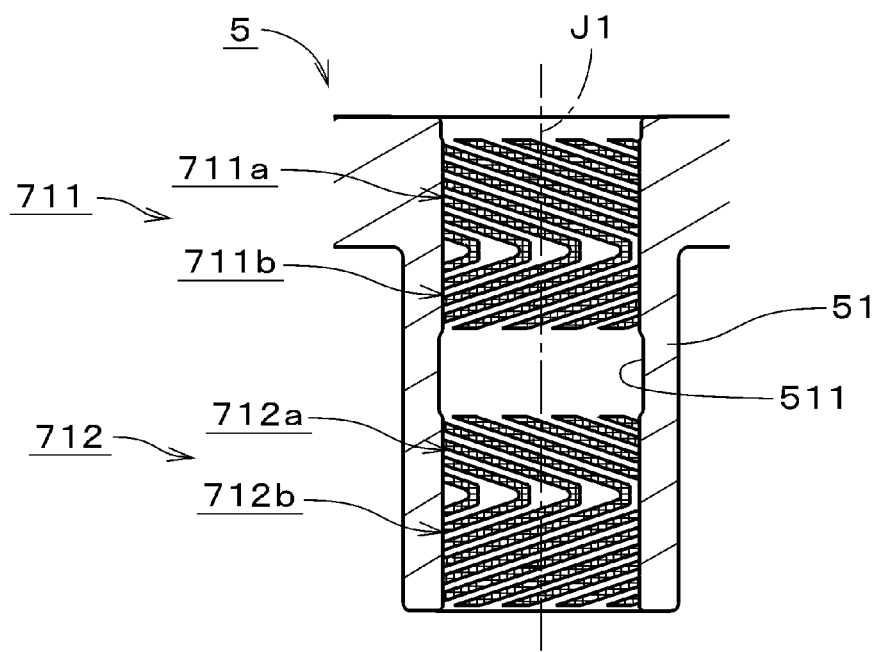
FIG. 7 is a cross-sectional view of a sleeve portion according to the first preferred embodiment of the present invention.

FIG. 7 is a cross-sectional view of the sleeve portion 5. In FIG. 7, the shape of an inner circumferential surface of the sleeve portion 5 is also depicted. The inner tubular portion 51 preferably includes an upper radial dynamic pressure groove array 711 and a lower radial dynamic pressure groove array 712 defined in the inner circumferential surface 511 thereof. The upper radial dynamic pressure groove array 711 is arranged on an upper side of a substantial axial middle of the inner circumferential surface 511. The lower radial dynamic pressure groove array 712 is arranged on a lower side of the substantial axial middle of the inner circumferential surface 511. In FIG. 7, dynamic pressure grooves are indicated by cross-hatching. Also in other figures referenced below, dynamic pressure grooves are indicated by cross-hatching. The upper radial dynamic pressure groove array 711 preferably includes a collection of grooves arranged in, for example, a herringbone pattern, that is, a collection of a plurality of grooves each of which is arranged substantially in the shape of the letter "v" in horizontal orientation along a circumferential direction of the inner circumferential surface 511. The axial dimension of an upper portion of the upper radial dynamic pressure groove array 711 is preferably greater than that of a lower portion of the upper radial dynamic pressure groove array 711. Hereinafter, the upper portion and the lower portion of the upper radial dynamic pressure groove array 711 will be referred to as a "groove upper portion 711a" and a "groove lower portion 711b", respectively. The lower radial dynamic pressure groove array 712 also preferably includes grooves arranged in the herringbone pattern. The axial dimension of a groove upper portion 712a of the lower radial dynamic pressure groove array 712 is arranged to be smaller than that of a groove lower portion 712b of the lower radial dynamic pressure groove array 712.

The lower thrust gap 652 illustrated in FIG. 5 is preferably arranged at a level higher than that of an upper end of the groove upper portion 712a of the lower radial dynamic pressure groove array 712. In the radial gap 62, a radial dynamic pressure bearing 81 arranged to generate a radial fluid dynamic pressure acting on the lubricating oil is defined through the upper and lower radial dynamic pressure groove arrays 711 and 712. The radial dynamic pressure bearing 81 corresponds to a dynamic pressure bearing.

Hereinafter, an upper dynamic pressure bearing portion corresponding to the upper radial dynamic pressure groove array 711 will be referred to as an "upper radial dynamic pressure bearing portion 811", while a lower dynamic pressure bearing portion corresponding to the lower radial dynamic pressure groove array 712 will be referred to as a "lower radial dynamic pressure bearing portion 812". As illustrated in FIG. 3, the lower radial dynamic pressure bearing portion 812 is preferably arranged to overlap in the radial direction with an adhesion region 436 where the lower portion of the outer circumferential surface of the outer tubular portion 432 and the holder 211 of the base plate 21 are, for example, adhered to each other.

Note that it is sufficient that the level of the lower thrust gap 652 is arranged to be higher than that of an upper end of at least one of the dynamic pressure grooves defining the lower radial dynamic pressure groove array 712. Also note that the level of the lower thrust gap 652 may be arranged to be higher than that of an upper end of each of all the dynamic pressure grooves defining the lower radial dynamic pressure groove array 712. These arrangements fall within the scope of preferred embodiments of the present invention.

Figure 8:
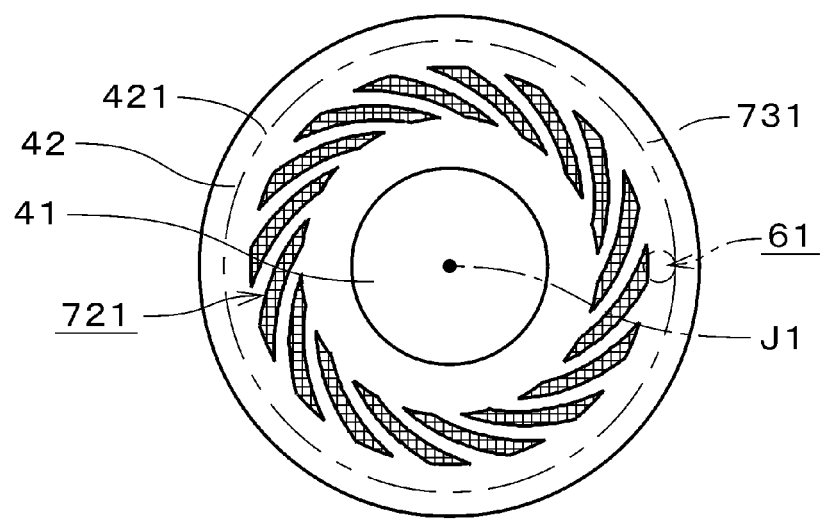
FIG. 8 is a bottom view of a shaft portion and an upper thrust portion according to the first preferred embodiment of the present invention.

FIG. 8 is a bottom view of the shaft portion 41 and the upper thrust portion 42. In FIG. 8, a position corresponding to the communicating hole 61 is indicated by a chain double-dashed line. The same holds true for FIG. 9. The lower surface 421 of the upper thrust portion 42 includes an upper thrust dynamic pressure groove array 721 arranged in a spiral pattern defined therein. The upper thrust dynamic pressure groove array 721 is arranged radially inward of a circle 731 which is centered on the central axis J1 and which touches an upper end opening of the communicating hole 61 at a radially outer point. Note that, in the case where the upper end opening is provided with a chamfer, the upper thrust dynamic pressure groove array 721 is preferably arranged radially inward of a circle which is centered on the central axis J1 and which touches the chamfer at a radially outer point. An outer edge portion of the upper thrust dynamic pressure groove array 721 is arranged to overlap with the upper end opening of the communicating hole 61. In the upper thrust gap 651 illustrated in FIG. 5, a dynamic pressure bearing portion 821, which is a dynamic pressure generation portion arranged to generate a fluid dynamic pressure acting on the lubricating oil 45 in a thrust direction, is defined through the upper thrust dynamic pressure groove array 721. Hereinafter, the dynamic pressure bearing portion 821 will be referred to as an "upper thrust dynamic pressure bearing portion 821".

Note that it is sufficient that at least one of dynamic pressure grooves that define the upper thrust dynamic pressure groove array 721 should be arranged radially inward of the circle 731. Also note that all of the dynamic pressure grooves that define the upper thrust dynamic pressure groove array 721 may be arranged radially inward of the circle 731. These arrangements fall within the scope of preferred embodiments of the present invention.

Figure 9:
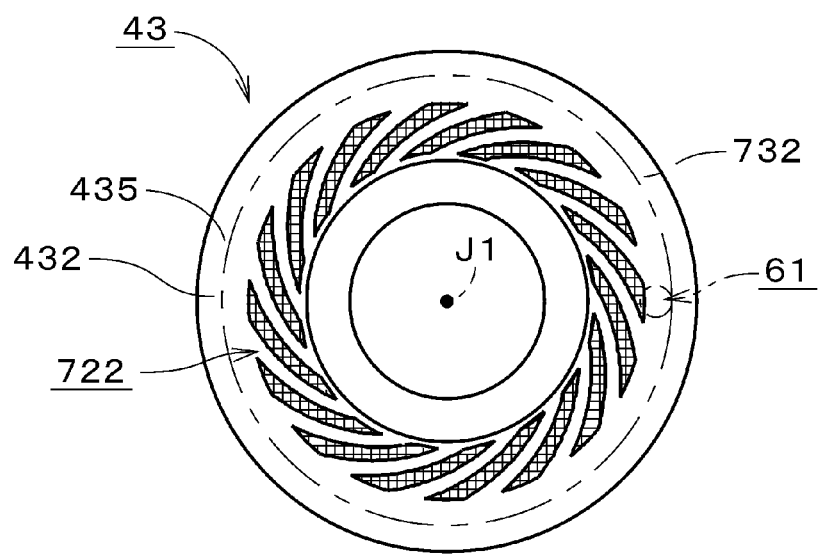
FIG. 9 is a plan view of a lower thrust portion according to the first preferred embodiment of the present invention.

FIG. 9 is a plan view of the lower thrust portion 43. The upper surface 435 of the outer tubular portion 432 includes a lower thrust dynamic pressure groove array 722 arranged in the spiral pattern defined therein. The lower thrust dynamic pressure groove array 722 is preferably arranged radially inward of a circle 732 which is centered on the central axis J1 and which touches a lower end opening of the communicating hole 61 at a radially outer point. Note that, in the case where the lower end opening is provided with a chamfer, the lower thrust dynamic pressure groove array 722 is preferably arranged radially inward of a circle which is centered on the central axis J1 and which touches the chamfer at a radially outer point. An outer edge portion of the lower thrust dynamic pressure groove array 722 is arranged to overlap with the lower end opening of the communicating hole 61. In the lower thrust gap 652 illustrated in FIG. 5, a dynamic pressure bearing portion 822, which is a dynamic pressure generation portion arranged to generate a fluid dynamic pressure acting on the lubricating oil 45 in the thrust direction, is defined through the lower thrust dynamic pressure groove array 722. Hereinafter, the dynamic pressure bearing portion 822 will be referred to as a "lower thrust dynamic pressure bearing portion 822".

Note that it is sufficient that at least one of dynamic pressure grooves that define the lower thrust dynamic pressure groove array 722 is arranged radially inward of the circle 732. Also note that all of the dynamic pressure grooves that define the lower thrust dynamic pressure groove array 722 may be arranged radially inward of the circle 732. These arrangements fall within the scope of preferred embodiments of the present invention.

Even when the upper thrust dynamic pressure groove array 721 is arranged to overlap with the upper end opening of the communicating hole 61, and the lower thrust dynamic pressure groove array 722 is arranged to overlap with the lower end opening of the communicating hole 61, a difference in pressure between an interior and an exterior of the communicating hole 61 is eliminated through a region where the upper thrust dynamic pressure groove array 721 or the lower thrust dynamic pressure groove array 722 is not arranged. As a result, a reduction in a difference in pressure between the upper seal portion 661a and the lower seal portion 662a is achieved.

While the motor 12 is driven, the inner tubular portion 51 of the sleeve portion 5 is supported by the radial dynamic pressure bearing 81 in the radial direction with respect to the shaft portion 41, while the flange portion 52 is supported by a thrust dynamic pressure bearing defined by the upper thrust dynamic pressure bearing portion 821 and the lower thrust dynamic pressure bearing portion 822 in the thrust direction with respect to the upper thrust portion 42 and the outer tubular portion 432.

At this time, each of the upper radial dynamic pressure groove array 711 and the lower radial dynamic pressure groove array 712 illustrated in FIG. 7 generates a sufficient dynamic pressure by pumping the lubricating oil 45 to a middle portion thereof. As described above, the groove lower portion 711b of the upper radial dynamic pressure groove array 711 is preferably arranged to be shorter than the groove upper portion 711a thereof, while the groove upper portion 712a of the lower radial dynamic pressure groove array 712 is preferably arranged to be shorter than the groove lower portion 712b thereof. The radial dynamic pressure bearing 81 as a whole is arranged to generate very little pressure acting on the lubricating oil 45 in the vertical direction.

Meanwhile, in the upper thrust gap 651 illustrated in FIG. 5, a pressure acting on the lubricating oil 45 in the direction of the shaft portion 41 is generated by the upper thrust dynamic pressure bearing portion 821. The pressure on the lubricating oil 45 is thereby increased in a top portion of the radial gap 62 and a radially inner portion of the upper thrust gap 651, whereby the generation of an air bubble is prevented therein.

In the lower thrust dynamic pressure bearing portion 822, a pressure acting on the lubricating oil 45 in the direction of the cylindrical gap 64 is generated. The pressure on the lubricating oil 45 is increased in a bottom portion of the radial gap 62, the lower end gap 63, the cylindrical gap 64, and a radially inner portion of the lower thrust gap 652, whereby the generation of an air bubble is prevented in the cylindrical gap 64 and the lower end gap 63. As described above, in the motor 12, a pressure is applied to the lubricating oil 45 throughout an entire circulation channel of the lubricating oil 45 except for the communicating hole 61, so that a sufficient bearing performance of the bearing mechanism 4 is preferably ensured.

When the bearing mechanism 4 is assembled, the upper thrust portion 42 is preferably, for example, press fitted to the upper portion of the shaft portion 41 illustrated in FIG. 4. The adhesive 48 is applied to an upper end 461 of the fixing region 46, over which the shaft portion 41 and the upper thrust portion 42 are fixed to each other, preferably over an entire circumference or substantially an entire circumference thereof. The inner end portion 444 of the seal cap 44 is attached to the upper end portion 424a of the cylindrical portion 424. The inner end portion 444 of the seal cap 44 is thereby fixed to the shaft and the upper thrust portion 42 through the adhesive. Notice that the inner end portion 444 of the seal cap 44 is spaced away from the upper surface 424b of the upper end portion 424a of the upper thrust member 42. In other words, the inner end portion 444 of the seal cap 44 is arranged opposite the upper surface 424b of the upper end portion 424a of the upper thrust member 42 with an axially extending gap intervening therebetween.

At this time, the holding gap 47 is defined between the upper surface 424b of the upper end portion 424a of the upper thrust portion 42, the outer circumferential surface of the shaft portion 41, and the lower surface 440 of the seal cap 44. The adhesive 48 is held in the holding gap 47. The adhesive 48 held in the holding gap 47 is preferably arranged continuously from the upper end 461 of the fixing region 46. Furthermore, a holding space 47b, which will be described below, is defined between the inclined surface 424c of the cylindrical portion 424 and the lower surface 440 of the seal cap 44. Note that the adhesive 48 may be applied to the inner end portion 444 before attachment of the seal cap 44.

Notice here that, when the upper thrust portion 42 is press fitted to the shaft portion 41, the inner circumferential surface of the upper thrust portion 42 and the outer circumferential surface of the shaft portion 41 may be scratched. If this happens, a portion of the lubricating oil 45 may travel to the upper end 461 of the fixing region 46 through a scratch, since the lower end 462 of the fixing region 46 is in contact with a portion of the lubricating oil 45 which is present at the junction of the upper thrust gap 651 and the radial gap 62. In the motor 12, the upper end 461 of the fixing region 46 is sealed with the adhesive 48 over the entire circumference thereof, and this contributes to preventing an oil leak, that is, a leakage of the lubricating oil 45 through the upper end 461 of the fixing region 46.

The motor 12 according to the first preferred embodiment has been described above. In the motor 12, the inner end portion 444 of the seal cap 44 is fixed to the upper end 461 of the fixing region 46, over which the shaft portion 41 and the upper thrust portion 42 are fixed to each other, through the adhesive 48. Moreover, the upper end 461 is covered with the adhesive 48 over the entire circumference thereof. This contributes to easily preventing or substantially preventing a leakage of the lubricating oil 45 due to so-called migration, i.e., a movement of the lubricating oil 45 to the upper end 461 through a scratch in the fixing region 46. In the motor 12, the adhesive 48, which is used to fix the seal cap 44, is used also to seal the upper end 461 of the fixing region 46 as described above. This eliminates a need for an additional operation to seal the fixing region 46, so that an increase in the number of processing steps needed to assemble the motor 12 can be avoided.

The axial distance between the surface of the lubricating oil 45 in the upper seal portion 661a and the surface of the lubricating oil 45 in the lower seal portion 662a is shorter than the axial length of the radial dynamic pressure bearing 81. The axial length of the radial dynamic pressure bearing 81 refers to the distance between an upper end and a lower end of the radial dynamic pressure bearing 81. More specifically, the axial length of the radial dynamic pressure bearing 81 refers to the distance between an upper end of the groove upper portion 711a of the upper radial dynamic pressure groove array 711 and a lower end of the groove lower portion 712b of the lower radial dynamic pressure groove array 712. Note that a portion that does not contribute to the function of the dynamic pressure bearing may exist between the upper and lower ends. The same holds true for other preferred embodiments of the present invention described below. A reduction in the difference in pressure between the upper seal portion 661a and the lower seal portion 662a is achieved by arranging the upper seal portion 661a and the lower seal portion 662a to be closer to each other in the axial direction as described above. This facilitates preventing or substantially preventing leakage of the lubricating oil 45.

Moreover, the axial length of the communicating hole 61 is preferably shorter than the axial distance between the upper seal portion 661a and the lower seal portion 662a. This contributes to reducing the amount of the lubricating oil 45 arranged in the communicating hole 61, and at the same time to reducing channel resistance. A reduction in a difference in pressure between the upper seal gap 661 and the lower seal gap 662 owing to influence of the channel resistance and gravity acting on the lubricating oil 45 in the communicating hole 61 is achieved. This contributes to reducing movement of the lubricating oil 45 between the upper seal gap 661 and the lower seal gap 662, and to more easily preventing a leakage of the lubricating oil 45.

Furthermore, the cylindrical gap 64, which corresponds to the second gap, is arranged to be in communication with a lower portion of the radial gap 62, which corresponds to the first gap, while at the same time the lower thrust gap 652, which corresponds to the third gap, is arranged axially above the lower radial dynamic pressure bearing portion 812. This arrangement makes it possible to arrange the lower thrust gap 652 to be closer to the upper thrust gap 651, thereby easily reducing the length of the communicating hole 61, which is arranged to make the upper thrust gap 651 and the lower thrust gap 652 communicate with each other. As a result, the upper seal portion 661a and the lower seal portion 662a are arranged to be closer to each other.

The communicating hole 61 is arranged to extend in parallel or substantially in parallel with the central axis J1 to reduce a difference between the distance from the upper end opening of the communicating hole 61 to the upper seal gap 661 and the distance from the lower end opening of the communicating hole 61 to the lower seal gap 662. This arrangement contributes to further reducing the difference in pressure between the upper seal gap 661 and the lower seal gap 662.

Furthermore, each of the upper seal gap 661 and the lower seal gap 662 has an end opening angled in such a direction as to face the central axis J1. Therefore, during rotation of the motor 12, the lubricating oil 45 is pressed inward in each of the upper seal gap 661 and the lower seal gap 662 through a centrifugal force. This contributes to more securely preventing a leakage of the lubricating oil 45. As a result, the performance of the motor 12 is improved.

The upper thrust dynamic pressure groove array 721 is arranged to extend radially outward to such an extent that the outer edge portion of the upper thrust dynamic pressure groove array 721 overlaps with the communicating hole 61. As a result, a thrust dynamic pressure is efficiently obtained, and a portion of the flange portion 52 which is in the vicinity of an outer edge thereof is supported by the upper thrust dynamic pressure bearing portion 821. This contributes to more stable support of the sleeve portion 5. The same holds true for the lower thrust dynamic pressure groove array 722.

In the motor 12, the lower thrust gap 652 is arranged in the upper portion of the bearing mechanism 4. Accordingly, a space is secured below the lower thrust gap 652 and the adhesion region 436 where the outer tubular portion 432 and the base plate 21 are adhered to each other, can be arranged in this space. This enables the adhesion region 436 to have a sufficient axial dimension. In the motor 12, a greater axial length of the radial gap 62 is preferred because an increase in the axial length of the radial dynamic pressure bearing 81 can thereby be achieved, and an improvement in rigidity of the bearing mechanism 4 against an external force acting in such a direction as to tilt the rotating portion 3 can also be achieved. The adhesion region 436 is arranged to overlap with at least a portion of the lower radial dynamic pressure bearing portion 812 in the radial direction. As a result, both an increase in the axial length of the radial gap 62 and an increase in the axial dimension of the adhesion region 436 are achieved. Moreover, a lower portion of the radial dynamic pressure bearing 81 is surrounded by the base plate 21 which thereby results in increased rigidity of the surroundings of the lower portion of the radial dynamic pressure bearing 81. Furthermore, a reduction in the thickness of the motor 12 as a whole in the direction parallel or substantially parallel to the central axis J1 is achieved.

Because the lower plate portion 431 and the outer tubular portion 432 are defined by a single continuous monolithic member, a reduction in the number of components of the motor 12 is achieved. It is easy to define the communicating hole 61 in the sleeve portion 5 because the communicating hole 61 is arranged to have a small axial length and to extend in parallel or substantially in parallel with the central axis J1. A reduction in the total amount of the lubricating oil 45 is also achieved. Note that the diameter of the communicating hole 61 may be reduced to as small as the width of the cylindrical gap 64 in order to achieve an additional reduction in the amount of the lubricating oil 45.

Figure 10:
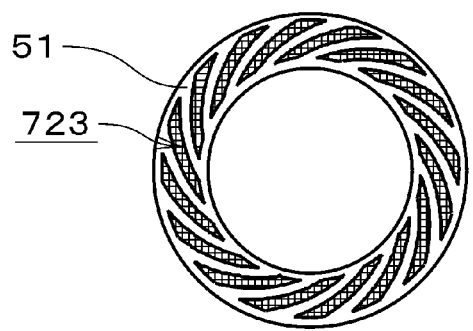
FIG. 10 is a diagram illustrating an inner tubular portion according to a modification of the first preferred embodiment of the present invention.

FIG. 10 is a bottom view of the inner tubular portion 51 according to a modification of the first preferred embodiment. Referring to FIG. 10, in the motor 12, a lower surface of the inner tubular portion 51 may include a thrust dynamic pressure groove array 723 defined therein. As a result, a thrust dynamic pressure bearing portion arranged to support the inner tubular portion 51 in the thrust direction is defined in the lower end gap 63 illustrated in FIG. 3. In this case, a dynamic pressure generation portion that functions as a thrust dynamic pressure bearing portion does not necessarily need to be arranged in the lower thrust gap 652. Note, however, that it is preferable that a dynamic pressure groove array which defines a dynamic pressure generation portion arranged to induce a radially inward pressure acting on the lubricating oil 45 should be arranged in the lower thrust gap. In the case of the structure illustrated in FIG. 10, the axial width of the lower thrust gap is preferably arranged to be greater than that of the lower end gap. The same holds true for a second preferred embodiment of the present invention described below.

Figure 11:
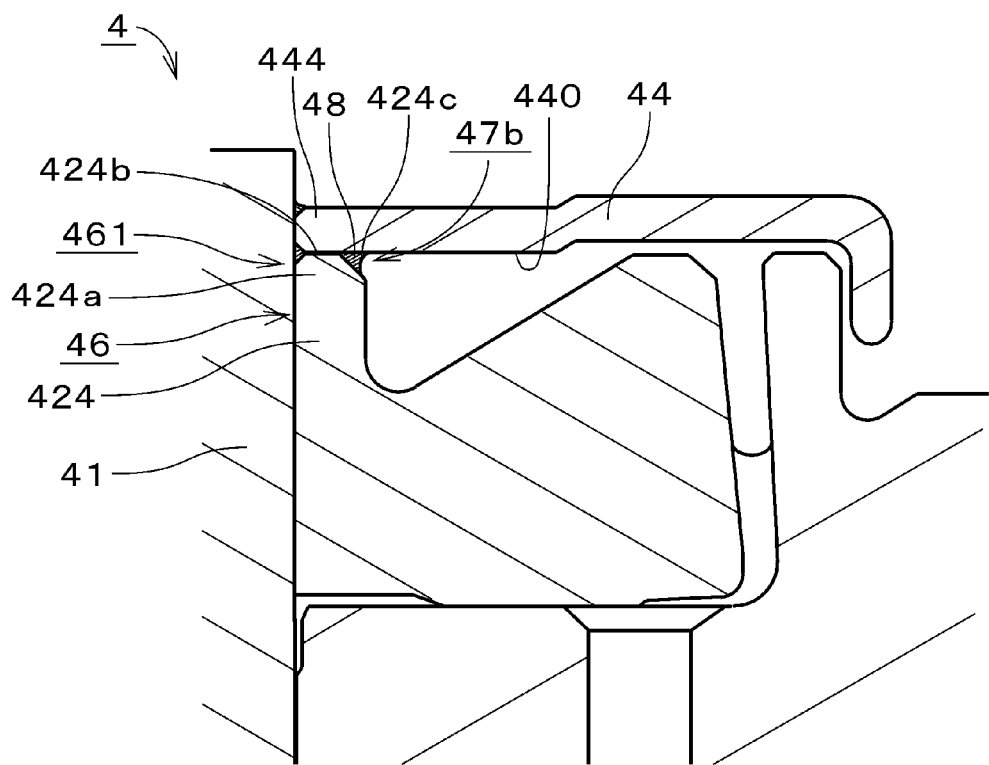
FIG. 11 is a cross-sectional view of a bearing mechanism according to a modification of the first preferred embodiment of the present invention.

FIG. 11 is a diagram illustrating a bearing mechanism 4 according to a modification of the first preferred embodiment. In this bearing mechanism 4, the inner end portion 444 of the seal cap 44 is arranged to be in contact with the upper surface 424*b* of the cylindrical portion 424 of the upper thrust portion 42. Moreover, the inner end portion 444 and the shaft portion 41 are fixed to each other preferably through, for example, tight fitting and adhesion. The holding space 47*b* is defined between the lower surface 440 of the seal cap 44 and the inclined surface 424*c*, which is arranged at the outer edge of the upper end portion 424*a* of the cylindrical portion 424. The holding space 47*b* is preferably annular and arranged to gradually increase in width with increasing distance from the central axis J1. The adhesive 48 is held in the holding space 47*b*, and is continuously arranged therein from the upper end 461 of the fixing region 46. The holding space 47*b* is arranged to prevent or substantially prevent the adhesive 48 from leaking radially outwardly of the cylindrical portion 424 through capillary action during assemblage of the bearing mechanism 4.

Note that the inner end portion 444 of the seal cap 44 may not necessarily be fixed to the outer circumferential surface of the shaft portion 41 in the tight-fitting condition, but may be arranged radially outward of the shaft portion 41 in a loose-fitting condition and fixed thereto through, for example, the adhesive 48, with the adhesive 48 being arranged also between the shaft portion 41 and the inner end portion 444. The same holds true for the second preferred embodiment.

Figure 12:
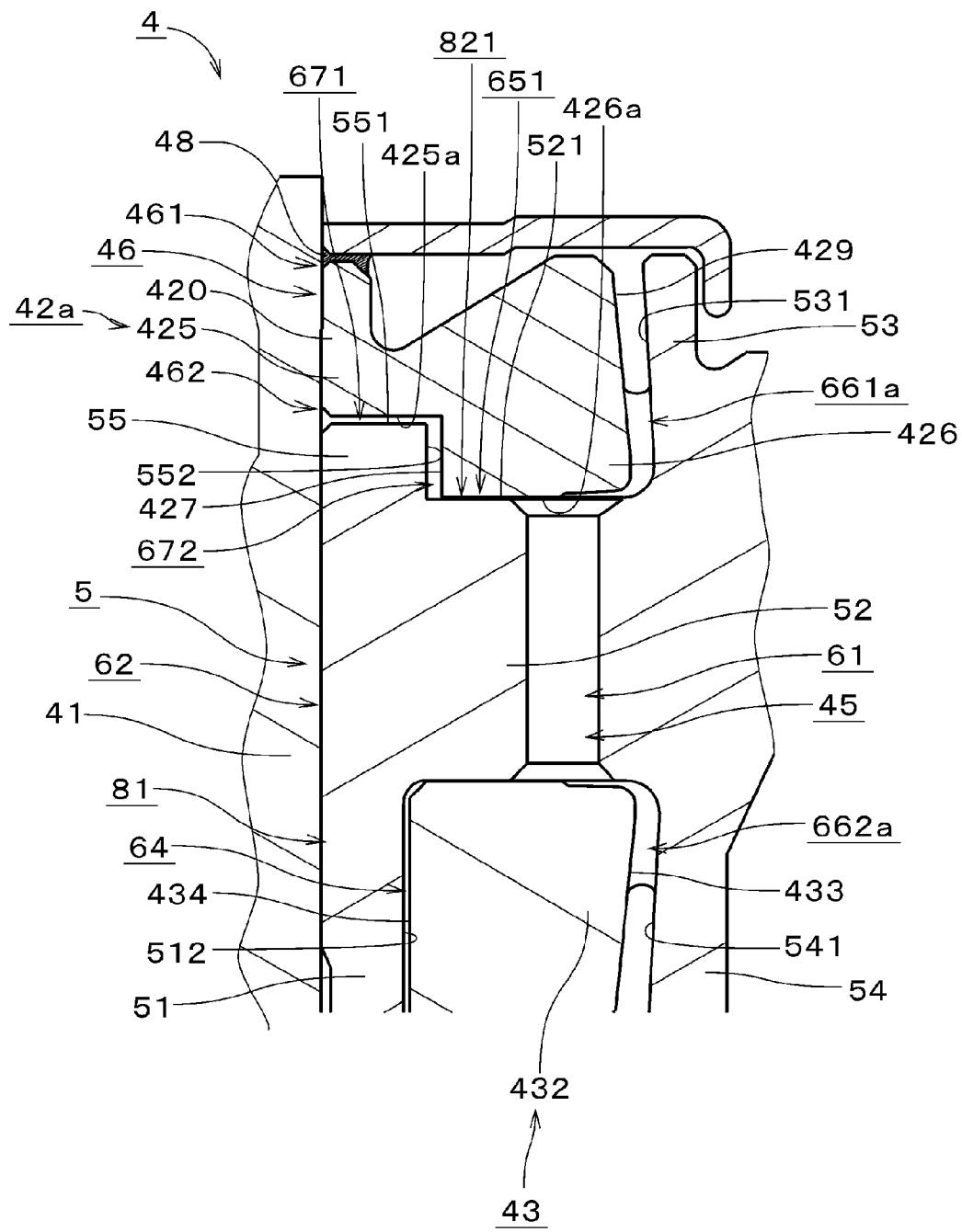
FIG. 12 is a cross-sectional view of a bearing mechanism according to another modification of the first preferred embodiment of the present invention.

FIG. 12 is a diagram illustrating a portion of a bearing mechanism 4 according to another modification of the first preferred embodiment. The sleeve portion 5 of the bearing mechanism 4 preferably includes an upper inner tubular portion 55 which is annular and arranged to extend upward from the upper portion of the inner tubular portion 51. Hereinafter, the inner tubular portion 51 will be referred to as a "lower inner tubular portion 51" when distinguished from the upper inner tubular portion 55. An upper thrust portion 42*a* includes an upper plate portion 425 arranged to extend radially outward from the upper portion of the shaft portion 41, and an upper outer tubular portion 426 arranged to extend downward from an outer edge portion of the upper plate portion 425. Hereinafter, the outer tubular portion 432 of the lower thrust portion 43 will be referred to as a "lower outer tubular portion 432" when distinguished from the upper outer tubular portion 426. The bearing mechanism 4 according to this modification of the first preferred embodiment is otherwise similar in structure to the bearing mechanism 4 of the motor 12 illustrated in FIG. 5. Accordingly, like members or portions are designated by like reference numerals and redundant description is omitted.

In the bearing mechanism 4, the joining portion 420 of the upper plate portion 425 is fixed to the shaft portion 41 preferably in the tight-fitting condition. Some reference numerals are omitted in FIG. 12 for convenience of illustration, and reference is made to reference symbols in FIG. 4. In a manner similar to that illustrated in FIG. 4, the inner end portion 444 of the cap cover portion 442 of the seal cap 44 is preferably fixed to the cylindrical portion 424 of the upper plate portion 425 through, for example, adhesion, and to the outer circumferential surface of the shaft portion 41 through, for example, press fitting and adhesion. Moreover, the upper end 461 of the fixing region 46, over which the shaft portion 41 and the upper plate portion 425 are fixed to each other, is preferably sealed with the adhesive 48 over the entire circumference thereof.

Referring to FIG. 12, a gap 671 is defined between an upper surface 551 of the upper inner tubular portion 55 and a lower surface 425a of the upper plate portion 425 in the axial direction, i.e., in the vertical direction in FIG. 12. Hereinafter, the gap 671 will be referred to as an "upper end gap 671". The lower end of the fixing region 46 is arranged to be in contact with the lubricating oil 45 at a junction of the upper end gap 671 and the radial gap 62. In the bearing mechanism 4, the upper end 461 of the fixing region 46 is sealed, and this contributes to easily preventing or substantially preventing the lubricating oil 45 from traveling from the lower end 462 of the fixing region 46 through a scratch in the fixing region 46 to leak out of the motor 12.

A cylindrical gap 672 is defined between an outer circumferential surface 552 of the upper inner tubular portion 55 and an inner circumferential surface 427 of the upper outer tubular portion 426 in the radial direction. Hereinafter, the gap 672 will be referred to as an "upper cylindrical gap 672". Hereinafter, the cylindrical gap 64, which is defined between the outer circumferential surface 512 of the lower inner tubular portion 51 and the inner circumferential surface 434 of the lower outer tubular portion 432, will be referred to as a "lower cylindrical gap 64" when distinguished from the upper cylindrical gap 672.

An upper thrust dynamic pressure groove array 721 similar to that illustrated in FIG. 8 is defined in a lower surface 426a of the upper outer tubular portion 426 of the upper thrust portion 42a. As a result, an upper thrust dynamic pressure bearing portion 821 is defined in an upper thrust gap 651 defined between the lower surface 426a and the upper surface 521 of the flange portion 52. In the bearing mechanism 4, the upper thrust dynamic pressure bearing portion 821 and the radial dynamic pressure bearing 81 are arranged to be in communication with each other through the upper cylindrical gap 672 and the upper end gap 671.

An upper seal portion 661a is defined between an outer circumferential surface 429 of the upper thrust portion 42a and the inner circumferential surface 531 of the upper hub tubular portion 53. The lower seal portion 662a is defined between the inclined surface 433 of the lower outer tubular portion 432 and the inner circumferential surface 541 of the lower hub tubular portion 54. The upper seal portion 661a and the lower seal portion 662a are arranged to be in communication with each other through the communicating hole 61. The axial distance between the upper end of the surface of the lubricating oil 45 in the upper seal portion 661a and the lower end of the surface of the lubricating oil 45 in the lower seal portion 662a is preferably longer than the axial length of the communicating hole 61 and preferably shorter than the axial length of the radial dynamic pressure bearing 81.

In the bearing mechanism 4, the axial distance between the surface of the lubricating oil 45 in the upper seal portion 661a and the surface of the lubricating oil 45 in the lower seal portion 662a is shorter than the axial length of the radial dynamic pressure bearing 81. This arrangement contributes to reducing a difference in pressure between the upper seal portion 661a and the lower seal portion 662a. This contributes to preventing or substantially preventing a leakage of the lubricating oil 45. Furthermore, the length of the communicating hole 61 being shorter than the distance between the upper seal portion 661a and the lower seal portion 662a makes it easier to prevent a leakage of the lubricating oil 45.

Providing the upper cylindrical gap 672 and the lower cylindrical gap 64 contributes to reducing the length of the communicating hole 61. The reduced length of the communicating hole 61 contributes to arranging the upper seal portion 661a and the lower seal portion 662a to be closer to each other, whereby a leakage of the lubricating oil 45 is prevented more easily. Moreover, the upper end gap 671 and the upper cylindrical gap 672 are arranged between the upper thrust dynamic pressure bearing portion 821 and the radial dynamic pressure bearing 81. This arrangement contributes to increased pressure on the lubricating oil 45 in the upper end gap 671 and the upper cylindrical gap 672, whereby the generation of an air bubble is prevented or substantially prevented therein.

In the bearing mechanism 4, the upper surface 551 of the upper inner tubular portion 55 may include a thrust dynamic pressure groove array similar to the thrust dynamic pressure groove array 723 illustrated in FIG. 10 defined therein. This results in a thrust dynamic pressure bearing portion being defined in the upper end gap 671 to support the upper inner tubular portion 55 in the thrust direction. In this case, a dynamic pressure generation portion that functions as an upper thrust dynamic pressure bearing portion may not necessarily be arranged in the upper thrust gap 651. Note, however, that it is preferable that a dynamic pressure groove array which defines a dynamic pressure generation portion arranged to induce a pressure acting radially inward on the lubricating oil 45 should be arranged in the upper thrust gap 651. The axial width of the upper end gap 671 is preferably arranged to be greater than that of the upper thrust gap 651.

Figure 13:
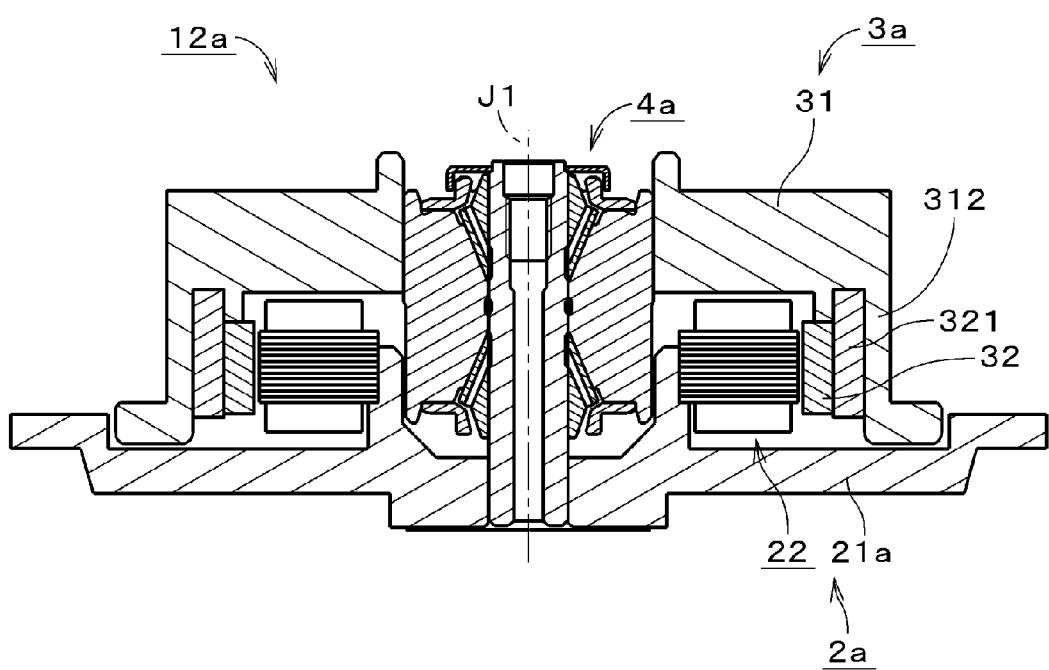
FIG. 13 is a cross-sectional view of a motor according to a second preferred embodiment of the present invention.

FIG. 13 is a cross-sectional view of a motor 12a according to the second preferred embodiment. The motor 12a includes a stationary portion 2a, a rotating portion 3a, and a bearing mechanism 4a. The stationary portion 2a preferably includes a base bracket 21a and an annular stator 22. The rotating portion 3a preferably includes a rotor hub 31, a rotor magnet 32, and a back iron 321. The rotor magnet 32 is substantially annular and centered on a central axis J1. The rotor magnet 32 is arranged radially inward of a cylindrical portion 312 of the rotor hub 31 with the back iron 321 intervening therebetween.

Figure 14:
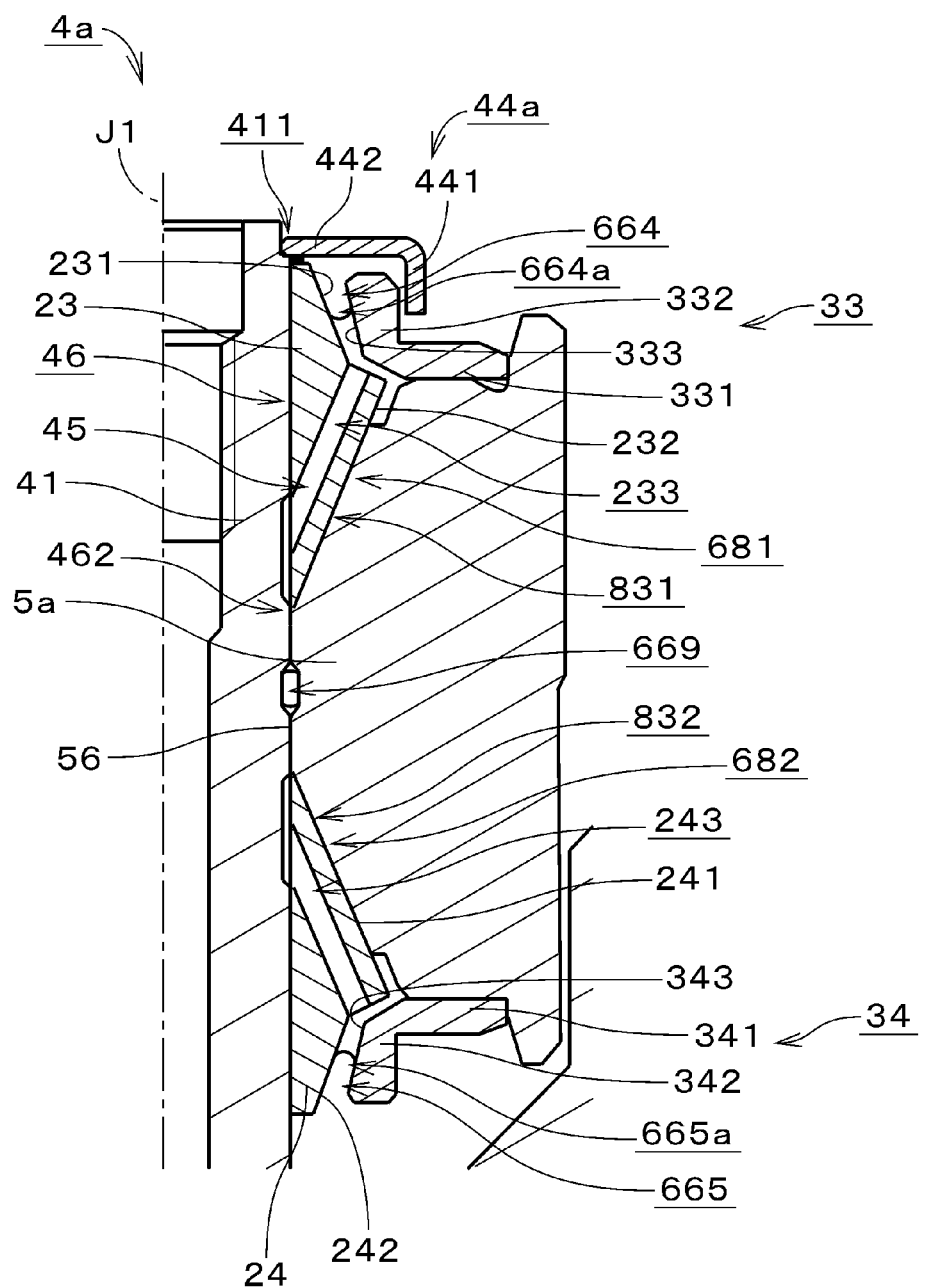
FIG. 14 is a cross-sectional view of a bearing mechanism according to the second preferred embodiment of the present invention.

FIG. 14 is an enlarged view of the bearing mechanism 4a. The bearing mechanism 4a preferably includes a shaft portion 41, a sleeve portion 5a, an upper cone member 23, a lower cone member 24, an upper seal defining member 33, a lower seal defining member 34, and a seal cap 44a. The sleeve portion 5a is inserted in a central hole portion defined in the rotor hub 31 illustrated in FIG. 13. The shaft portion 41 is inserted in the sleeve portion 5a. An upper end portion of an outer circumferential surface of the shaft portion 41 includes a shoulder portion 411 having a decreased diameter. A lower portion of the shaft portion 41 is fixed to a hole portion defined in the base bracket 21a illustrated in FIG. 13.

The upper cone member 23 is preferably arranged in the shape of a spindle. The upper cone member 23 is preferably fixed to an upper portion of the outer circumferential surface of the shaft portion 41 in, for example, a tight-fitting condition. An upper portion of the upper cone member 23 includes an upper inclined surface 231. The upper inclined surface 231 is arranged to be angled radially outward with decreasing height. A lower portion of the upper cone member 23 includes a lower inclined surface 232 and a communicating hole 233. The lower inclined surface 232 is arranged to be angled radially outward with increasing height. The communicating hole 233 is preferably arranged to be angled radially outward with increasing height. The upper inclined surface 231 and the lower inclined surface 232 together define an outer circumferential surface of the upper cone member 23.

The lower cone member 24 is preferably identical in shape to the upper cone member 23 but arranged upside down relative to the upper cone member 23. The lower cone member 24 is preferably fixed to the outer circumferential surface of the shaft portion 41 in, for example, a tight-fitting condition on a lower side of the upper cone member 23. An upper portion of the lower cone member 24 includes an upper inclined surface 241 and a communicating hole 243. The upper inclined surface 241 is arranged to be angled radially outward with decreasing height. The communicating hole 243 is arranged to be angled radially outward with decreasing height. A lower portion of the lower cone member 24 includes a lower inclined surface 242. The lower inclined surface 242 is arranged to be angled radially outward with increasing height.

The upper seal defining member 33 includes an annular portion 331 and an upper seal defining portion 332. The upper seal defining portion 332 is preferably substantially cylindrical in shape, and is arranged to extend upward from an inner end of the annular portion 331. The annular portion 331 is attached to an upper portion of the sleeve portion 5a. The upper seal defining portion 332 is arranged radially outward of the upper cone member 23. An inner circumferential surface 333 of the upper seal defining portion 332 is arranged to be angled radially outward with decreasing height. The lower seal defining member 34 is identical in shape to the upper seal defining member 33 but arranged upside down relative to the upper seal defining member 33. The lower seal defining portion 34 includes an annular portion 341 and a lower seal defining portion 342. The lower seal defining portion 342 is preferably substantially cylindrical in shape, and is arranged to extend downward from an inner end of the annular portion 341. The annular portion 341 is attached to a lower portion of the sleeve portion 5a. The lower seal defining portion 342 is arranged radially outward of the lower cone member 24.

Figure 15:
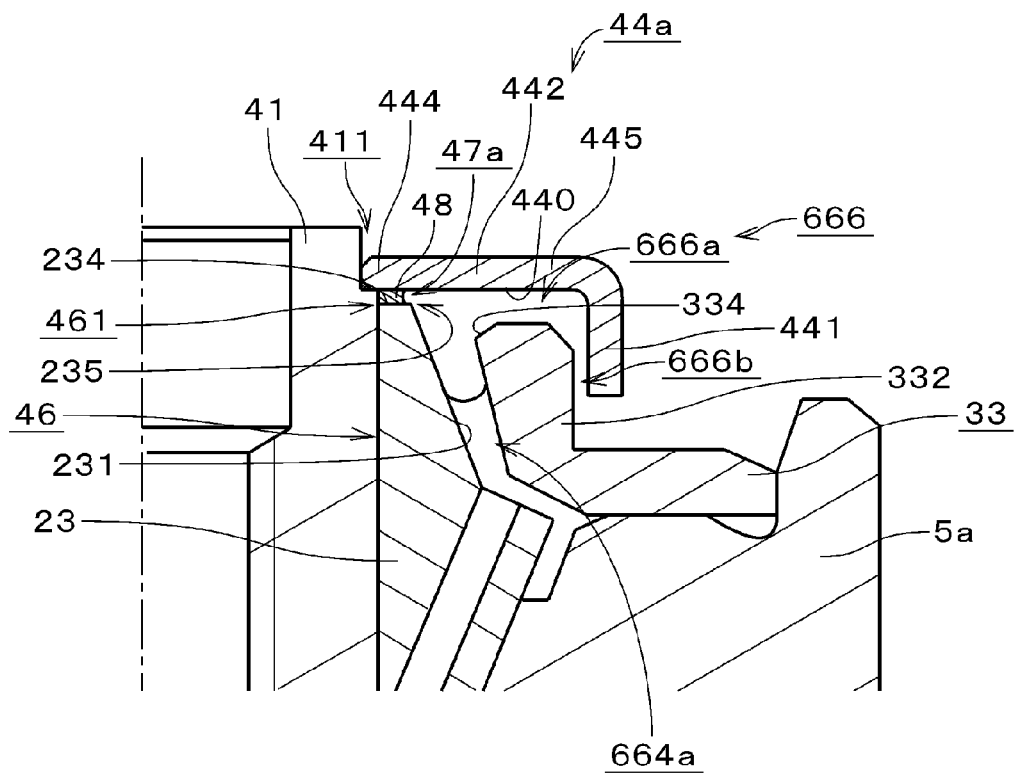
FIG. 15 is another cross-sectional view of the bearing mechanism according to the second preferred embodiment of the present invention.

The seal cap 44a preferably includes a cap cylindrical portion 441 and a cap cover portion 442. Referring to FIG. 15, an inner end portion 444 of the cap cover portion 442, i.e., a radially inner end portion thereof, is arranged to be in axial contact with the shoulder portion 411 of the shaft portion 41, and preferably fixed thereto through, for example, an adhesive 48. With the seal cap 44a fixed to the shaft portion 41, an annular gap 47a is defined between an upper end surface 234 of the upper cone member 23 and a lower surface 440 of the seal cap 44a. The gap 47a is arranged above an upper end 461 of a fixing region 46 over which the shaft portion 41 and the upper cone member 23 are fixed to each other. The adhesive 48 is held in the gap 47a. Hereinafter, the gap 47a will be referred to as a "holding gap 47a". The upper end 461 of the fixing region 46 is covered, over an entire circumference thereof, with the adhesive 48 arranged in the holding gap 47a.

Referring to FIG. 14, a first inclined gap 681 is defined between the lower inclined surface 232 of the upper cone member 23 and an upper portion of an inner circumferential surface 56 of the sleeve portion 5a. The first inclined gap 681 is arranged to be angled radially outward with increasing height. An upper seal gap 664 is defined between the upper inclined surface 231 of the upper cone member 23 and the inner circumferential surface 333 of the upper seal defining portion 332. The upper seal gap 664 is arranged to be angled toward the central axis J1 with increasing height.

A second inclined gap 682 is defined between the upper inclined surface 241 of the lower cone member 24 and a lower portion of the inner circumferential surface 56 of the sleeve portion 5a. The second inclined gap 682 is arranged to be angled radially outward with decreasing height. A lower seal gap 665 is defined between the lower inclined surface 242 of the lower cone member 24 and an inner circumferential surface 343 of the lower seal defining portion 342. The lower seal gap 665 is arranged to be angled toward the central axis J1 with decreasing height.

A lubricating oil 45 is held in two regions, i.e., an upper portion and a lower portion of the bearing mechanism 4a. The upper seal gap 664, the first inclined gap 681, and the communicating hole 233 of the upper cone member 23 are continuously filled with the lubricating oil 45. In addition, the lower seal gap 665, the second inclined gap 682, and the communicating hole 243 of the lower cone member 24 are continuously filled with the lubricating oil 45. An upper seal portion 664a and a lower seal portion 665a are defined in the upper seal gap 664 and the lower seal gap 665, respectively. Surfaces of the lubricating oil 45 are preferably arranged in the upper seal portion 664a and the lower seal portion 665a. In addition, surfaces of the lubricating oil 45 are also arranged in a gap 669 defined between the outer circumferential surface of the shaft portion 41 and a middle portion of the inner circumferential surface 56 of the sleeve portion 5a. A lower end 462 of the fixing region 46, over which the upper cone member 23 and the shaft portion 41 are fixed to each other, is arranged to be in contact with the lubricating oil 45.

While the motor 12a is driven, dynamic pressure bearings 831 and 832, each of which is arranged to produce a fluid dynamic pressure acting on the lubricating oil 45, are defined in the first inclined gap 681 and the second inclined gap 682, respectively, so that the sleeve portion 5a is supported to be rotatable with respect to the shaft portion 41.

Referring to FIG. 15, an outer edge portion 445 of the cap cover portion 442, i.e., a radially outer edge portion thereof, is arranged to define a radially extending gap 666a together with the upper seal defining portion 332. The cap cylindrical portion 441 is arranged to define an axially extending gap 666b together with an outer circumferential surface of the upper seal defining portion 332. The radially extending gap 666a and the axially extending gap 666b are arranged to together define a communicating gap 666 arranged to bring the upper seal portion 664a into communication with an outside of the motor 12a. The radial width of the axially extending gap 666b is preferably in the range of about 0.05 mm to about 0.2 mm, for example. The radial width of the axially extending gap 666b is preferably arranged to be smaller than a maximum radial width of the upper seal gap 664. The maximum radial width of the upper seal gap 664 refers to the radial distance in a plan view between an edge 235 at a junction of the upper end surface 234 and the upper inclined surface 231 of the upper cone member 23 and an upper end edge of a chamfer surface 334 defined on an upper side of the upper seal defining portion 332.

In the case where a chamfer surface is defined between the upper end surface 234 and the upper inclined surface 231 of the upper cone member 23, the maximum radial width of the upper seal gap 664 refers to the radial distance in the plan view between an upper end edge of this chamfer surface and the upper end edge of the chamfer surface 334 of the upper seal defining member 33. The axially extending gap 666b having a very small width contributes to reducing the likelihood that air including a lubricating oil gasified in the upper seal portion 664a will travel to the outside of the motor 12a through the communicating gap 666.

Also in the second preferred embodiment, the sealing of the upper end 461 of the fixing region 46 with the adhesive 48 contributes to preventing the lubricating oil 45 from leaking out through the fixing region 46. Providing the holding gap 47a, which is arranged to hold the adhesive 48 therein, between the upper cone member 23 and the seal cap 44a contributes to preventing or substantially preventing the adhesive 48 from entering into the upper seal portion 664a during assemblage of the bearing mechanism 4a.

In some bearing mechanisms, a seal cap is fixed to an upper portion of a sleeve portion, and a seal portion is defined between an upper cone member and the seal cap. In the case of such a bearing mechanism, since a lubricating oil is fed into the bearing mechanism after an upper seal gap is defined, a cap cover portion should preferably include an opening through which the lubricating oil is fed. In contrast, in the case of the bearing mechanism 4a, it is possible to attach the seal cap 44 to the shaft portion 41 after the feeding of the lubricating oil 45, and it is therefore easy to check the amount of the lubricating oil 45 fed into the bearing mechanism 4a.

Features of the above-described preferred embodiments and the modifications thereof may be combined appropriately as long as no conflict arises.

Figure 16:
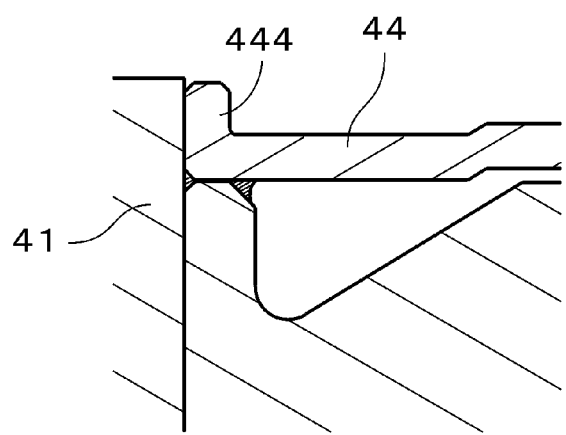
FIG. 16 is a cross-sectional view of a seal cap according to another preferred embodiment of the present invention.
Figure 17:
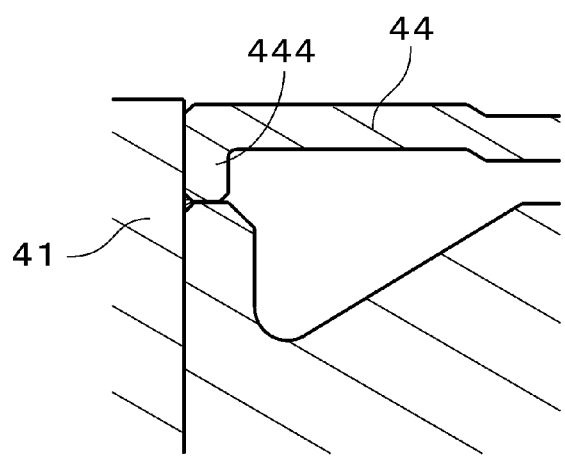
FIG. 17 is a cross-sectional view of a seal cap according to yet another preferred embodiment of the present invention.

In a modification of the first preferred embodiment, the inner end portion 444 of the seal cap 44 may be arranged to extend upward to be cylindrical or substantially cylindrical as illustrated in FIG. 16, or may be arranged to extend downward to be cylindrical or substantially cylindrical as illustrated in FIG. 17. In this case, an increase in an area over which the inner end portion 444 and the shaft portion 41 are in contact with each other is achieved to fix the seal cap 44 to the shaft portion 41 more securely. The same holds true for the second preferred embodiment.

Note that the structure arranged to hold the adhesive 48 as illustrated in FIG. 5 may be applied to the bearing mechanism 4a illustrated in FIG. 15. Also note that, conversely, the structure arranged to hold the adhesive 48 as illustrated in FIG. 15 may be applied to the bearing mechanism 4 illustrated in FIG. 5. Furthermore, although the shoulder portion 411 illustrated in FIG. 15 is arranged to have a decreased diameter, a shoulder portion arranged to have an increased diameter may be defined in the shaft portion 41 or in a portion that can be regarded as a shaft portion, with an upper surface of the inner end portion 444 of the seal cap 44 being arranged to be in contact with a lower surface of this shoulder portion.

Figure 18:
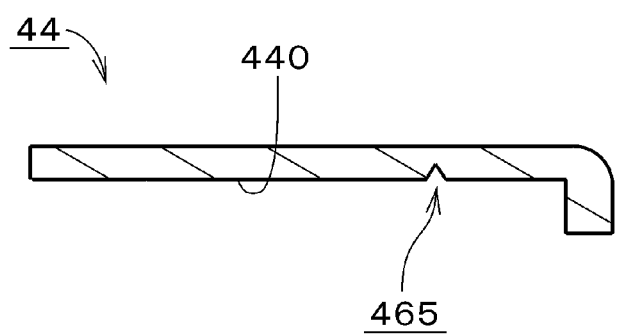
FIG. 18 is cross-sectional view of a seal cap according to yet another preferred embodiment of the present invention.

Referring to FIG. 18, the lower surface 440 of the seal cap 44 may include an annular, minute recessed portion 465 preferably in the shape of a cut, in other words, an annular shoulder portion of a minute size. The minute recessed portion 465 is arranged radially inward of the upper seal portion 661a illustrated in FIG. 5. An oil-repellent film 49 is preferably arranged on a portion of the lower surface 440 of the seal cap 44 which is radially outward of the minute recessed portion 465, with the minute recessed portion 465 used as a mark. A lower surface of the seal cap 44a may include an annular, minute raised portion. In the case where the lower surface of the seal cap 44a includes an annular shoulder portion arranged to extend upward or downward with decreasing distance from the central axis J1, it is possible to properly arrange the oil-repellent film 49 radially outward of this annular shoulder portion.

The annular member such as the upper thrust portion 42, the upper cone member 23, or the like need not necessarily be press fitted to the shaft portion 41 as long as the annular member is fixed to the shaft portion 41 in the tight-fit condition. For example, the annular member may be fixed to the shaft portion 41 through shrink fitting. Even in this case, the lubricating oil 45 is prevented or substantially prevented from leaking out through a minute gap defined between the shaft portion 41 and the annular member.

In a modification of the first preferred embodiment, the upper thrust portion 42 or 42a and the shaft portion 41 may be defined by a single continuous monolithic member. Also, the lower thrust portion 43 and the base plate 21 may be defined by a single continuous monolithic member. This contributes to reducing the number of components of the motor. Also, the lower thrust portion 43 and the shaft portion 41 may be defined by a single continuous monolithic member. Also, the lower plate portion 431 and the outer tubular portion 432 may be defined by separate members. In a modification of the second preferred embodiment, the upper cone member 23 and the shaft portion 41 may be defined by a single continuous monolithic member.

In the groove upper portion of the upper radial dynamic pressure groove array 711 illustrated in FIG. 7, a plurality of oblique grooves may be arranged to extend obliquely along the grooves defining the upper radial dynamic pressure groove array 711. Also, each of the grooves defining the upper radial dynamic pressure groove array 711 may be arranged to have a greater depth in the groove upper portion than in the groove lower portion. This leads to an increased downward pressure acting on the lubricating oil 45. The same holds true for the groove lower portion of the lower radial dynamic pressure groove array 712. Also, the upper portion and the lower portion of each of the grooves that define the upper radial dynamic pressure groove array 711 may be arranged to have substantially the same length. Also, the upper portion and the lower portion of each of the grooves that define the lower radial dynamic pressure groove array 712 may be arranged to have substantially the same length. A variety of modifications can be made to the length, depth, width, and so on of each of the dynamic pressure grooves without departing from the scope and spirit of the present invention.

Each of the upper thrust dynamic pressure groove array 721 and the lower thrust dynamic pressure groove array 722 may be arranged, for example, in the herringbone pattern if so desired. In this case, a radially outer portion of the upper thrust dynamic pressure groove array 721 is arranged to have a length greater than that of a radially inner portion thereof, and a radially outer portion of the lower thrust dynamic pressure groove array 722 is arranged to have a length greater than that of a radially inner portion thereof, in order to generate a radially inward pressure acting on the lubricating oil 45. Note that a plurality of oblique grooves may be arranged between radially outer portions of thrust dynamic pressure grooves. The radially outer portion of each thrust dynamic pressure groove may be arranged to have a depth greater than that of a radially inner portion thereof. Although a direction in which the lubricating oil 45 circulates has not been specified in the description of any of the above-described preferred embodiments, the direction in which the lubricating oil 45 circulates may be determined to be either a counterclockwise direction or a clockwise direction in FIG. 5.

In FIG. 5, in the case where the lower surface 421 of the upper thrust portion 42 is arranged to have a sufficient area, the upper thrust dynamic pressure groove array 721 may be arranged in a region spaced away from the communicating hole 61. Similarly, in the case where the upper surface 435 of the outer tubular portion 432 is arranged to have a sufficient area, the lower thrust dynamic pressure groove array 722 may be arranged in a region spaced away from the communicating hole 61. In the upper and lower thrust gaps 651 and 652, an upper thrust dynamic pressure groove array and a lower thrust dynamic pressure groove array may be arranged in the upper surface 521 and the lower surface 522, respectively, of the flange portion 52. Also, a radial dynamic pressure groove array may be arranged in the outer circumferential surface of the shaft portion 41.

In a modification of each of the above-described preferred embodiments, the width of the axially extending gap 663b or 666b may be decreased at portions. At least, a minimum width of the axially extending gap 663b or 666b is arranged to be smaller than the maximum width of the upper seal gap 661 or 664. This suffices to reduce the likelihood that air including a lubricating oil gasified in the upper seal portion 661a or 664a will travel to the outside of the motor 12 or 12a.

The upper seal gap 661 may be arranged to have a uniform or substantially uniform width. In this case, a dynamic pressure groove array is arranged in at least one of the outer circumferential surface 422 or 429 of the upper thrust portion 42 or 42a and the inner circumferential surface 531 of the upper hub tubular portion 53 to preferably define a so-called pumping seal. A dynamic pressure acting on the lubricating oil 45 inwardly in the upper seal gap 661 is thereby generated to retain the lubricating oil 45. The same holds true for the lower seal gap 662. Each of the upper seal portion 661a and the lower seal portion 662a may not necessarily be arranged to extend in parallel or substantially in parallel with the central axis J1, but may be arranged to be angled significantly with respect to the central axis J1.

Features of the above-described preferred embodiments and the modifications thereof may be combined appropriately as long as no conflict arises.

Preferred embodiments of the present invention are applicable to motors used to drive disks and also to many other types of motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
a stationary portion including a stator; and
a rotating portion including a rotor magnet, and arranged to rotate with respect to the stationary portion through a lubricating oil; wherein
the stationary portion includes:
a shaft portion centered on a central axis extending in a vertical direction;
an annular member fixed to an upper portion of the shaft portion in a tight-fitting condition; and
a cap member being annular in shape, and including a radially inner end portion fixed to each of the shaft portion and the annular member through an adhesive;
the rotating portion includes:
a sleeve portion arranged to have the shaft portion inserted therein; and
a seal defining portion arranged radially outward of the annular member to extend in an axial direction so as to be cylindrical or substantially cylindrical;
an outer circumferential surface of the annular member and an inner circumferential surface of the seal defining portion are arranged to together define an upper seal gap therebetween, the upper seal gap including an upper seal portion defined therein, the upper seal portion including a surface of the lubricating oil arranged therein;
the cap member is arranged to cover an axially upper side of the upper seal portion; and
a lower end of a fixing region over which the shaft portion and the annular member are in contact with each other is arranged to be in contact with the lubricating oil, while an upper end of the fixing region is covered with the adhesive over an entire circumference or substantially an entire circumference thereof.

2. The spindle motor according to claim 1, wherein
an upper surface of an upper end portion of the annular member, an outer circumferential surface of the shaft portion, and a lower surface of the cap member are arranged to together define a holding gap therebetween; and
the adhesive is held in the holding gap.

3. The spindle motor according to claim 2, wherein the radially inner end portion of the cap member is spaced away from the upper surface of the upper end portion of the annular member.

4. The spindle motor according to claim 3, wherein
an outer circumferential portion of the shaft portion includes a shoulder portion defined therein; and
the radially inner end portion of the cap member is arranged to be in axial contact with the shoulder portion.

5. The spindle motor according to claim 3, wherein
the annular member includes a cylindrical portion arranged to extend upward along the outer circumferential surface of the shaft portion;
an outer edge of an upper end portion of the cylindrical portion includes an inclined surface arranged to be angled downward with increasing distance from the central axis; and
the cap member and the inclined surface are arranged to together define an annular holding space therebetween, the holding space being arranged to hold the adhesive therein, the adhesive being arranged to extend continuously or substantially continuously from the upper end of the fixing region.

6. The spindle motor according to claim 2, wherein the radially inner end portion of the cap member is arranged to be in contact with the upper surface of the upper end portion of the annular member.

7. The spindle motor according to claim 6, wherein
the annular member includes a cylindrical portion arranged to extend upward along the outer circumferential surface of the shaft portion;
an outer edge of an upper end portion of the cylindrical portion includes an inclined surface arranged to be angled downward with increasing distance from the central axis; and
the cap member and the inclined surface are arranged to together define an annular holding space therebetween, the holding space being arranged to hold the adhesive therein, the adhesive being arranged continuously or substantially continuously from the upper end of the fixing region.

8. The spindle motor according to claim 1, wherein
the annular member includes a cylindrical portion arranged to extend upward along an outer circumferential surface of the shaft portion;
an outer edge of an upper end portion of the cylindrical portion includes an inclined surface arranged to be angled downward with increasing distance from the central axis; and
the cap member and the inclined surface are arranged to together define an annular holding space therebetween, the holding space being arranged to hold the adhesive therein, the adhesive being arranged continuously or substantially continuously from the upper end of the fixing region.

9. The spindle motor according to claim 1, wherein the tight-fitting condition is achieved by press fitting.

10. The spindle motor according to claim 1, wherein
the cap member includes a cap cylindrical portion arranged to extend downward from a radially outer end portion thereof; and
the cap cylindrical portion and an outer circumferential surface of the seal defining portion are arranged to together define an axially extending gap therebetween, the axially extending gap being arranged to bring the upper seal portion into communication with an outside of the spindle motor, a minimum width of the axially extending gap being smaller than a maximum width of the upper seal gap.

11. The spindle motor according to claim 1, wherein
a lower surface of the cap member includes an annular shoulder portion arranged to extend upward or downward with decreasing distance from the central axis; and
a portion of the lower surface of the cap member which is radially outward of the annular shoulder portion includes an oil-repellent film arranged thereon at all circumferential positions thereof.

12. The spindle motor according to claim 1, wherein
an upper portion of the annular member includes an upper inclined surface arranged to be angled radially outward with decreasing height;
a lower portion of the annular member includes a lower inclined surface arranged to be angled radially outward with increasing height;
the upper seal portion is defined between the upper inclined surface and the inner circumferential surface of the seal defining portion; and
the lower inclined surface and the sleeve portion are arranged to define a dynamic pressure bearing therebetween.

13. The spindle motor according to claim 1, wherein the radially inner end portion of the cap member is arranged to extend upward so as to be cylindrical or substantially cylindrical.

14. The spindle motor according to claim 1, wherein the radially inner end portion of the cap member is arranged to extend downward so as to be cylindrical or substantially cylindrical.

15. The spindle motor according to claim 1, wherein
the stationary portion further includes:
 a lower plate portion arranged to extend radially outward from a lower portion of the shaft portion;
 an outer tubular portion arranged to extend upward from an outer edge portion of the lower plate portion;
the sleeve portion includes:
 an inner tubular portion including an inner circumferential surface arranged to define a first gap together with an outer circumferential surface of the shaft portion, and an outer circumferential surface arranged to define a second gap together with an inner circumferential surface of the outer tubular portion;
 a flange portion arranged to project radially outward from the inner tubular portion, and including an upper surface arranged to define an upper thrust gap together with a lower surface of the annular member, and a lower surface arranged to define a lower thrust gap together with an upper surface of the outer tubular portion; and
 another seal defining portion arranged radially outward of the outer tubular portion to extend in the axial direction so as to be cylindrical or substantially cylindrical;
an outer circumferential surface of the outer tubular portion and an inner circumferential surface of the other seal defining portion are arranged to together define a lower seal portion therebetween, the lower seal portion including a surface of the lubricating oil arranged therein;
the upper seal portion, the upper thrust gap, the first gap, the second gap, the lower thrust gap, and the lower seal portion are continuously or substantially continuously filled with the lubricating oil; and
the first gap is arranged to have a dynamic pressure bearing defined therein.

16. The spindle motor according to claim 15, wherein
the inner circumferential surface of the seal defining portion includes a portion which is angled radially inward with increasing height;
the inner circumferential surface of the other seal defining portion includes a portion which is angled radially inward with decreasing height; and
a radial extension range of the inner circumferential surface of the seal defining portion and a radial extension range of the inner circumferential surface of the other seal defining portion are arranged to overlap with each other in the axial direction.

17. A storage disk drive comprising:
the spindle motor of claim 1 arranged to rotate a disk;
an access portion arranged to perform at least one of reading and writing of information from or to the disk; and
a housing arranged to contain the disk, the spindle motor, and the access portion.

* * * * *